United States Patent
Wingate, Jr. et al.

(10) Patent No.: US 10,846,076 B2
(45) Date of Patent: Nov. 24, 2020

(54) REMOTE APPLICATION UPDATE OF MEASUREMENT DEVICE FIELD FIRMWARE

(71) Applicant: Barfield, Inc., Miami, FL (US)

(72) Inventors: Lewes Delaware Wingate, Jr., Miami, FL (US); Alexis Rodriguez Reyes, Jacksonville, FL (US); Maria Mercedes Gonzalez, Miami Lakes, FL (US)

(73) Assignee: Barfield, Inc., Miami, FL (US)

( * ) Notice: Subject to any disclaimer, the term of this patent is extended or adjusted under 35 U.S.C. 154(b) by 0 days.

(21) Appl. No.: 15/730,098

(22) Filed: Oct. 11, 2017

(65) Prior Publication Data

US 2018/0101377 A1    Apr. 12, 2018

Related U.S. Application Data

(60) Provisional application No. 62/406,641, filed on Oct. 11, 2016.

(51) Int. Cl.
*G06F 9/44* (2018.01)
*G06F 8/65* (2018.01)
(Continued)

(52) U.S. Cl.
CPC ............ *G06F 8/65* (2013.01); *B64D 43/00* (2013.01); *B64D 43/02* (2013.01); *B64F 5/60* (2017.01);
(Continued)

(58) Field of Classification Search
None
See application file for complete search history.

(56) References Cited

U.S. PATENT DOCUMENTS

| 8,976,039 B2 | 3/2015 | O'Hara | |
| 2002/0046233 A1* | 4/2002 | Ganzert | G06F 8/60 709/201 |

(Continued)

OTHER PUBLICATIONS

Barfield DPS 1000 User Instruction Manual, Aug. 11, 2015.
(Continued)

*Primary Examiner* — Insun Kang
(74) *Attorney, Agent, or Firm* — Aldo Noto, Esq.; Davidson Berquist Jackson & Gowdey, LLP

(57) ABSTRACT

A system and method for automatically updating software on a measurement device includes a mobile computer application downloaded from an application store. A server pushes the application to the application store. A mobile device receives and runs the application. The mobile device connects wirelessly to the measurement device. When connected to the measurement device, the mobile device is prevented from having connections to networks or devices other than the measurement device. The measurement device includes pneumatic measuring equipment to perform calibration and testing on aircraft flight data instruments. The mobile application automatically triggers an update process for software on the measurement device. During the update process, the measuring equipment is not connected to any instruments. The updated software on the measurement device controls presentation of a user interface on the measurement device and controls operation of the measuring equipment. The mobile device remotely controls the measurement device.

16 Claims, 34 Drawing Sheets

(51) Int. Cl.
*G06F 8/71* (2018.01)
*B64D 43/02* (2006.01)
*G06F 8/654* (2018.01)
*G06F 8/61* (2018.01)
*B64D 43/00* (2006.01)
*B64F 5/60* (2017.01)
*H04L 29/08* (2006.01)
*H04W 84/12* (2009.01)
*H04W 76/10* (2018.01)
*H04W 4/60* (2018.01)
*H04W 4/80* (2018.01)

(52) U.S. Cl.
CPC ............... *G06F 8/61* (2013.01); *G06F 8/654* (2018.02); *G06F 8/71* (2013.01); *H04L 67/12* (2013.01); *H04L 67/34* (2013.01); *H04W 4/60* (2018.02); *H04W 4/80* (2018.02); *H04W 76/10* (2018.02); *H04W 84/12* (2013.01)

(56) References Cited

U.S. PATENT DOCUMENTS

| | | | | |
|---|---|---|---|---|
| 2007/0043833 | A1* | 2/2007 | Lu | G06F 8/65 709/219 |
| 2009/0077547 | A1* | 3/2009 | Kakinoki | G06F 8/656 717/168 |
| 2010/0048193 | A1* | 2/2010 | Ortion | G06F 8/60 455/418 |
| 2010/0153047 | A1* | 6/2010 | Youssefi | A61B 3/1015 702/85 |
| 2011/0167420 | A1* | 7/2011 | Bastien | G06F 8/65 717/173 |
| 2012/0036343 | A1* | 2/2012 | Lee | G06F 8/654 712/245 |
| 2012/0102475 | A1* | 4/2012 | Huang | G06F 8/66 717/168 |
| 2012/0124568 | A1* | 5/2012 | Fallon | G06F 9/453 717/169 |
| 2012/0180038 | A1* | 7/2012 | Hu | G06F 8/654 717/173 |
| 2013/0067450 | A1* | 3/2013 | Saugnac | G06F 8/65 717/170 |
| 2013/0127904 | A1* | 5/2013 | Dove | G06F 3/0488 345/629 |
| 2013/0157637 | A1* | 6/2013 | Bos | H04W 8/245 455/418 |
| 2014/0200013 | A1* | 7/2014 | Enns | H04L 29/08729 455/450 |
| 2014/0250430 | A1* | 9/2014 | Proud | G06F 8/65 717/168 |
| 2014/0258257 | A1* | 9/2014 | Schowalter | G06F 16/24 707/705 |
| 2014/0282491 | A1* | 9/2014 | Baraldi | G06F 8/61 717/174 |
| 2014/0359592 | A1* | 12/2014 | Phaedrus | G06F 8/65 717/168 |
| 2014/0359595 | A1* | 12/2014 | Sehgal | G06F 8/61 717/171 |
| 2015/0180840 | A1* | 6/2015 | Jung | G06F 8/654 713/150 |
| 2015/0268944 | A1* | 9/2015 | Chinnappan | G06F 8/65 717/173 |
| 2015/0293765 | A1* | 10/2015 | Angus | G06F 8/60 717/121 |
| 2015/0309716 | A1* | 10/2015 | Pauly | G06F 3/04842 715/771 |
| 2015/0317151 | A1* | 11/2015 | Falcy | H04L 67/28 717/173 |
| 2015/0339114 | A1* | 11/2015 | Rockwell | G06F 8/65 701/1 |
| 2016/0028872 | A1* | 1/2016 | Ripp | H04M 1/72525 455/418 |
| 2016/0110179 | A1* | 4/2016 | Weckesser | G06F 8/61 710/316 |
| 2016/0124738 | A1* | 5/2016 | Haukom | G06F 8/65 717/170 |
| 2016/0173337 | A1* | 6/2016 | Lea | H04L 43/0811 370/254 |
| 2016/0294614 | A1* | 10/2016 | Searle | G06F 8/654 |
| 2016/0352397 | A1* | 12/2016 | Faccin | H04B 7/0413 |
| 2017/0039372 | A1* | 2/2017 | Koval | H04W 4/38 |
| 2017/0060567 | A1* | 3/2017 | Kim | G06F 8/65 |
| 2017/0080949 | A1* | 3/2017 | Sinaguinan | B60W 50/0098 |
| 2017/0242676 | A1* | 8/2017 | Frayssignes | B64F 5/40 |
| 2017/0308371 | A1* | 10/2017 | Cantaloube | G06F 8/65 |
| 2018/0095742 | A1* | 4/2018 | Richter | G06F 8/65 |
| 2018/0121188 | A1* | 5/2018 | Srinivasan | G06F 8/65 |
| 2018/0234499 | A1* | 8/2018 | Borges | G06F 8/65 |
| 2019/0087168 | A1* | 3/2019 | Carranza | G06F 8/65 |
| 2019/0245696 | A1* | 8/2019 | Gulati | G06F 8/61 |

OTHER PUBLICATIONS

D. Marchiori s.r.l.—Aircraft Ground Support Equipment Brochure, Jun. 2007.
D. Marchiori s.r.l.—GMA-Aero Technical Note, Feb. 2006.

* cited by examiner

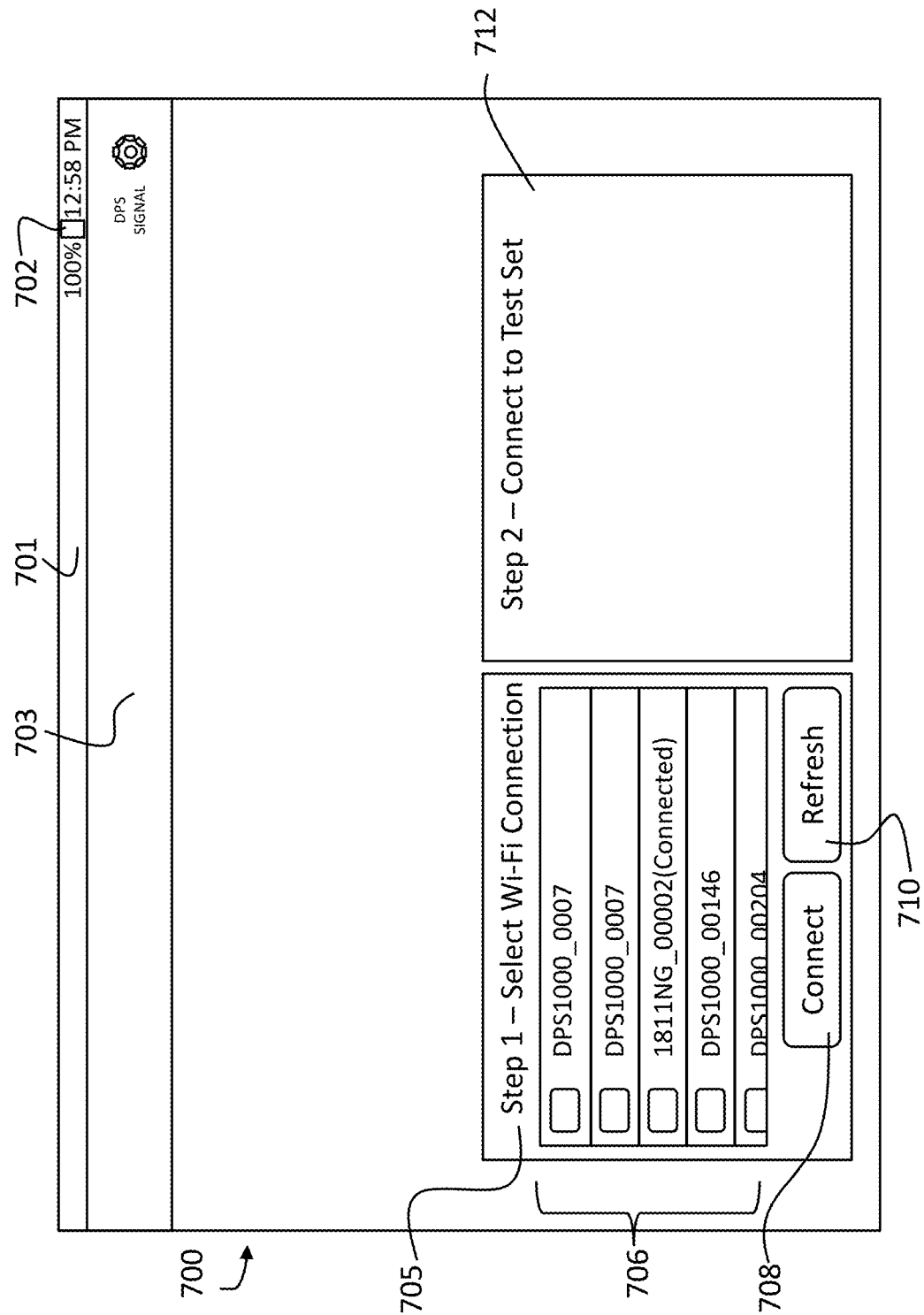
FIG. 7A1

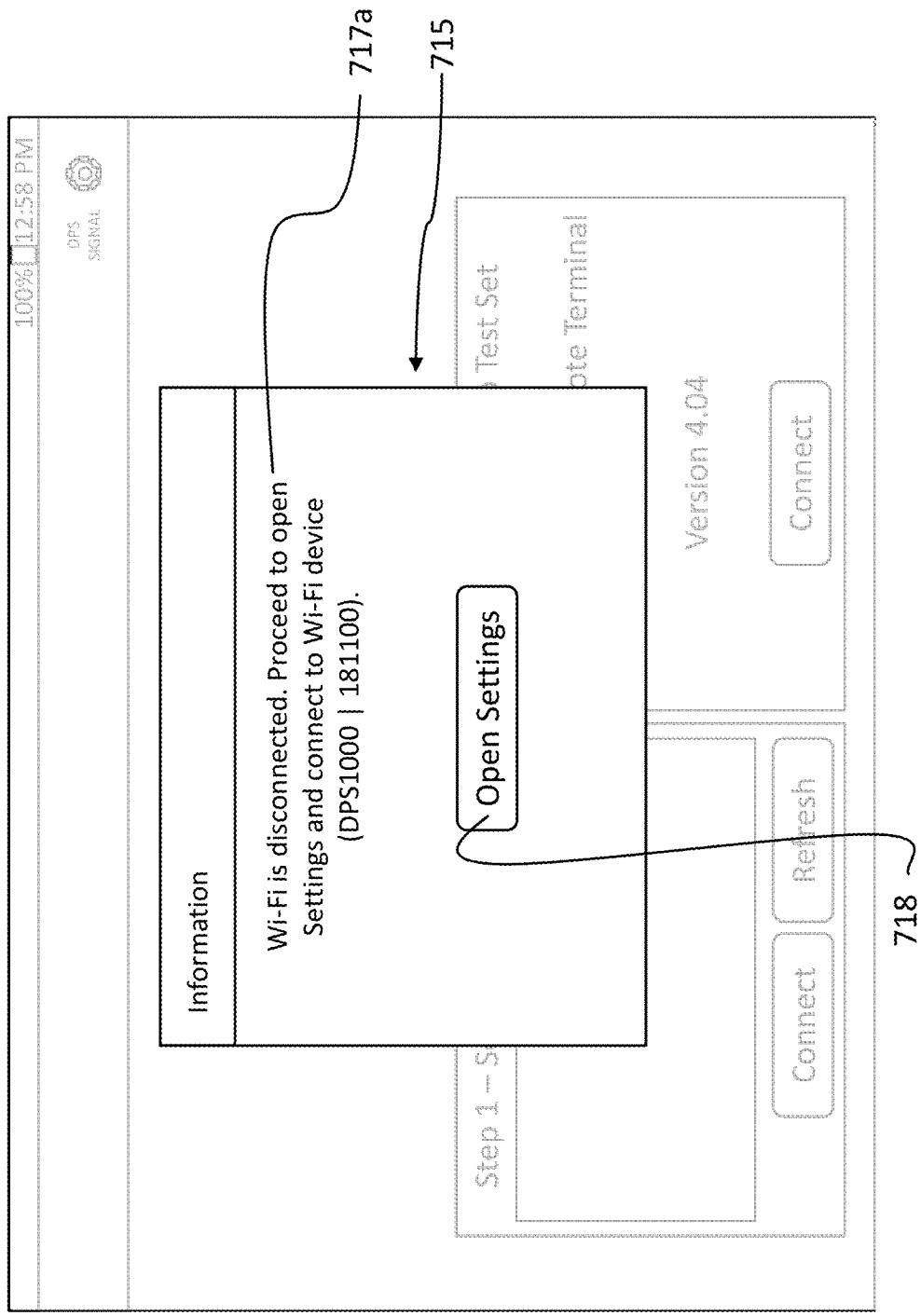
FIG. 7A2

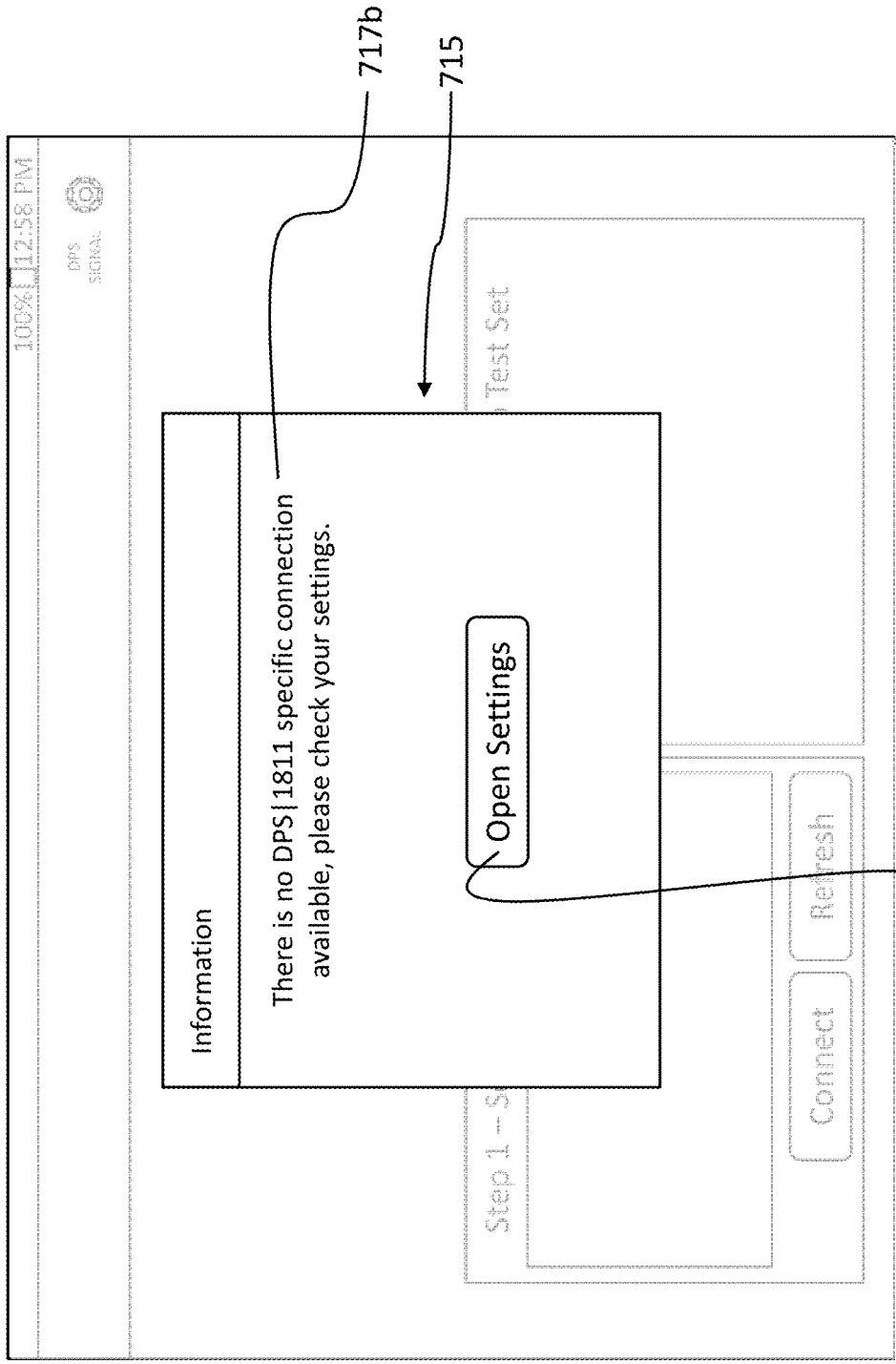
FIG. 7A3

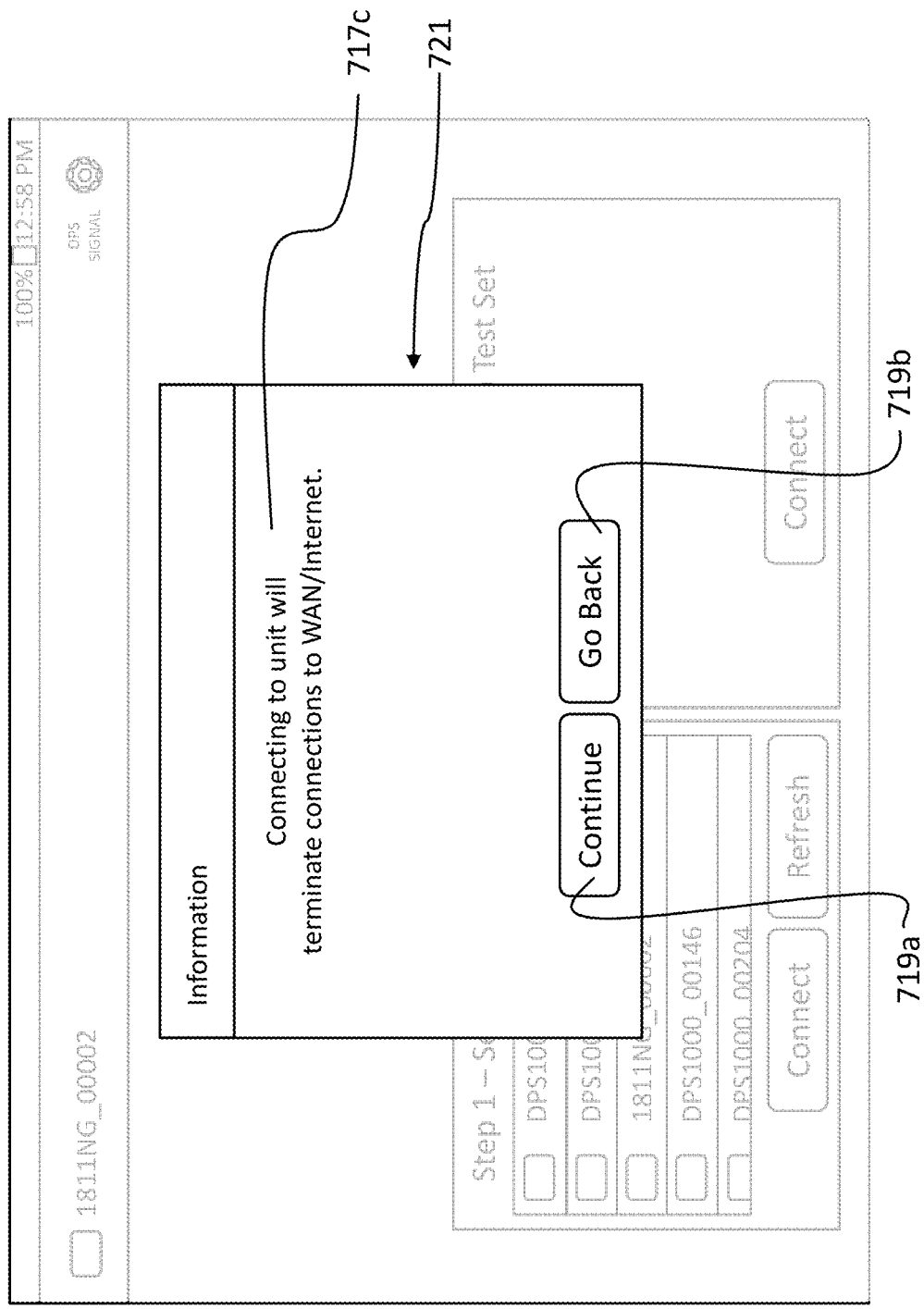
FIG. 7A4

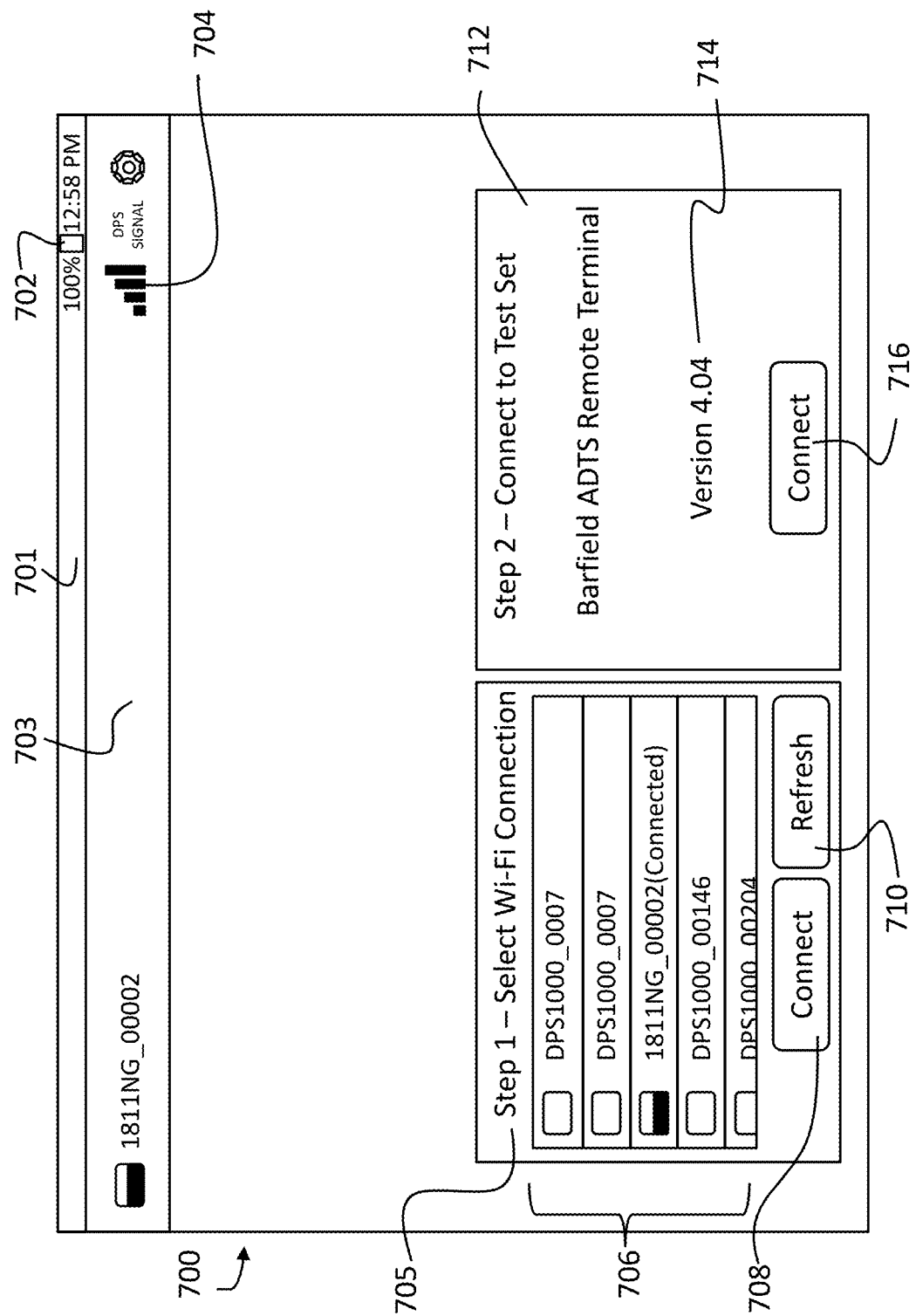
FIG. 7A5

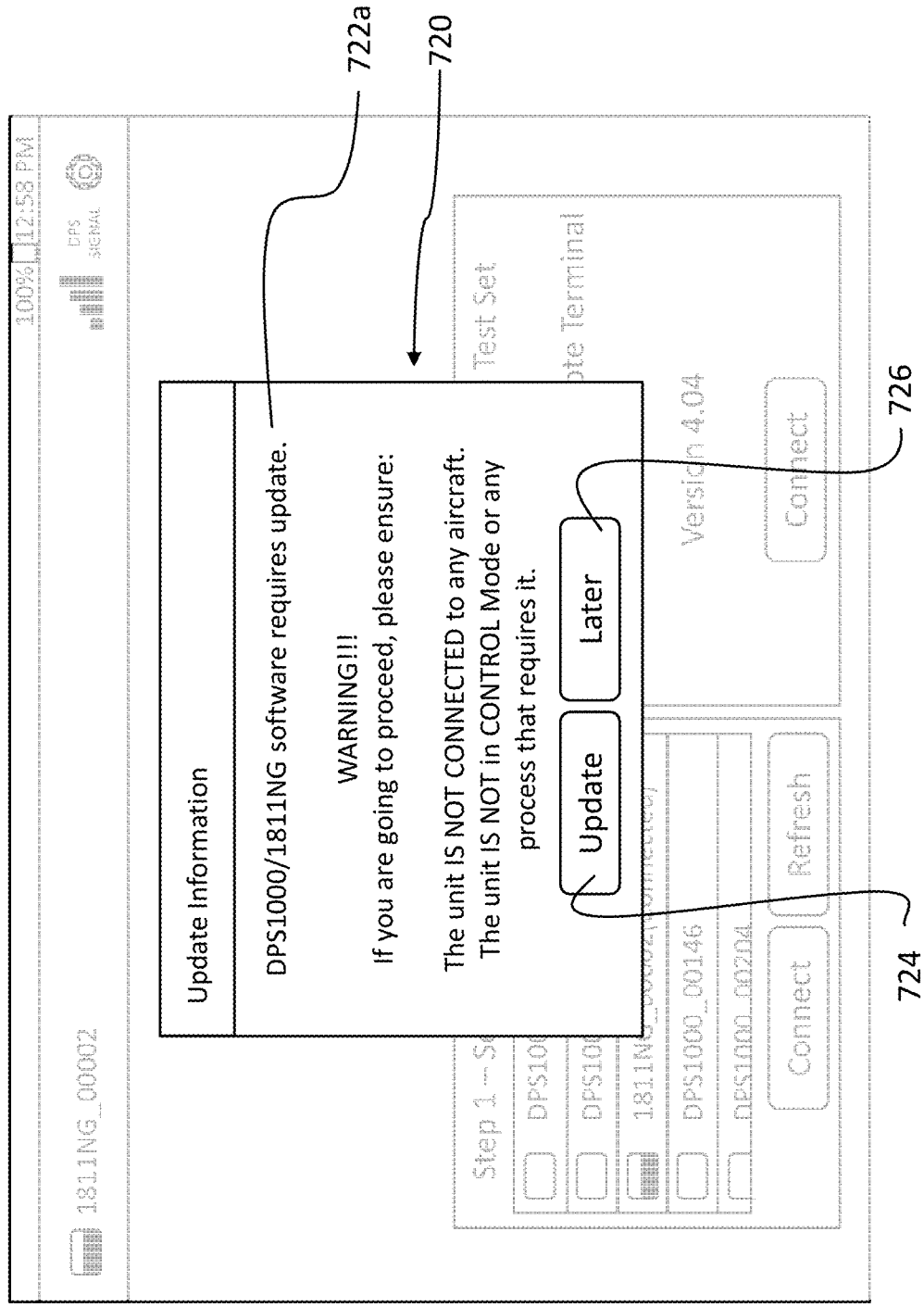
FIG. 7B1

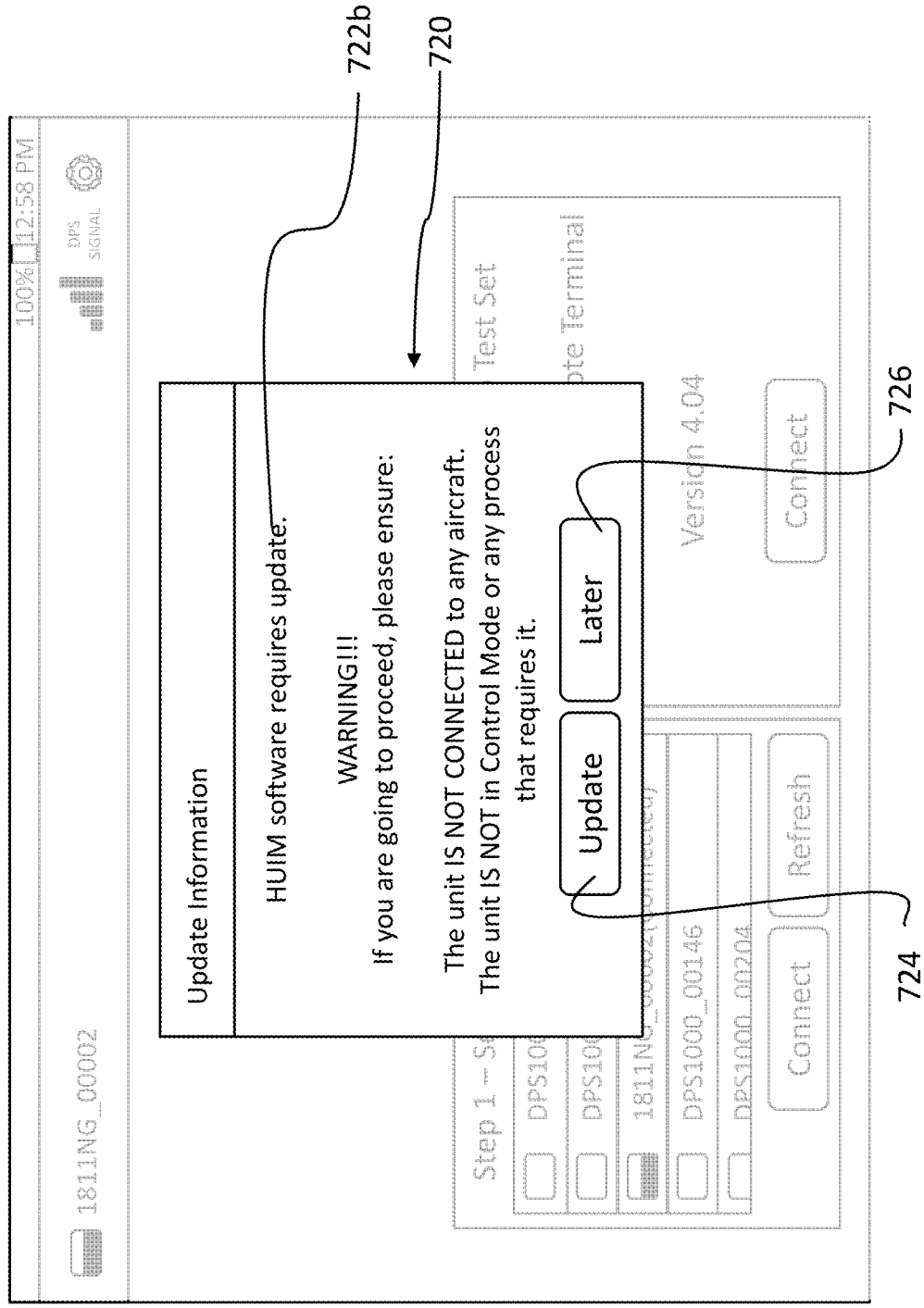
FIG. 7B2

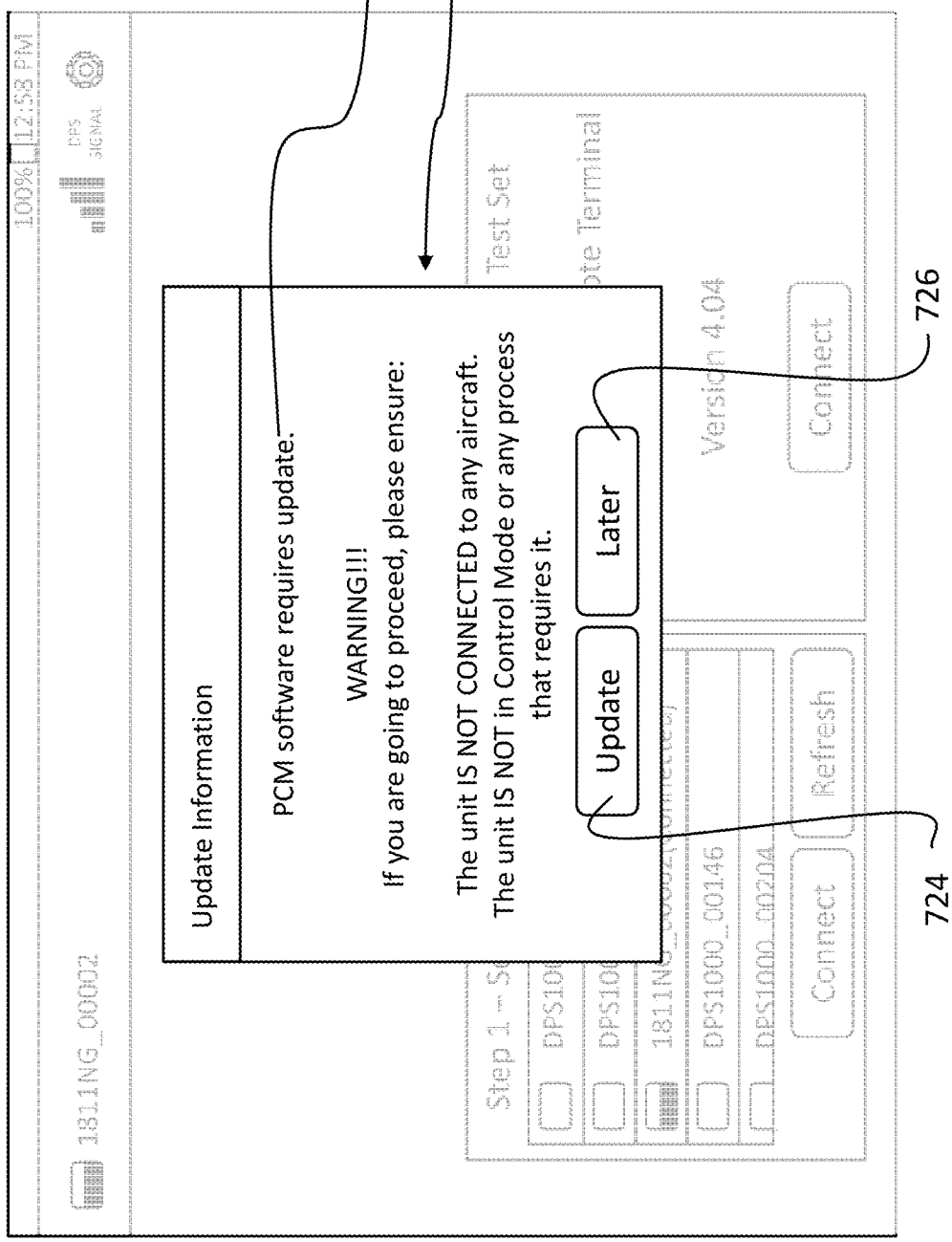
FIG. 7B3

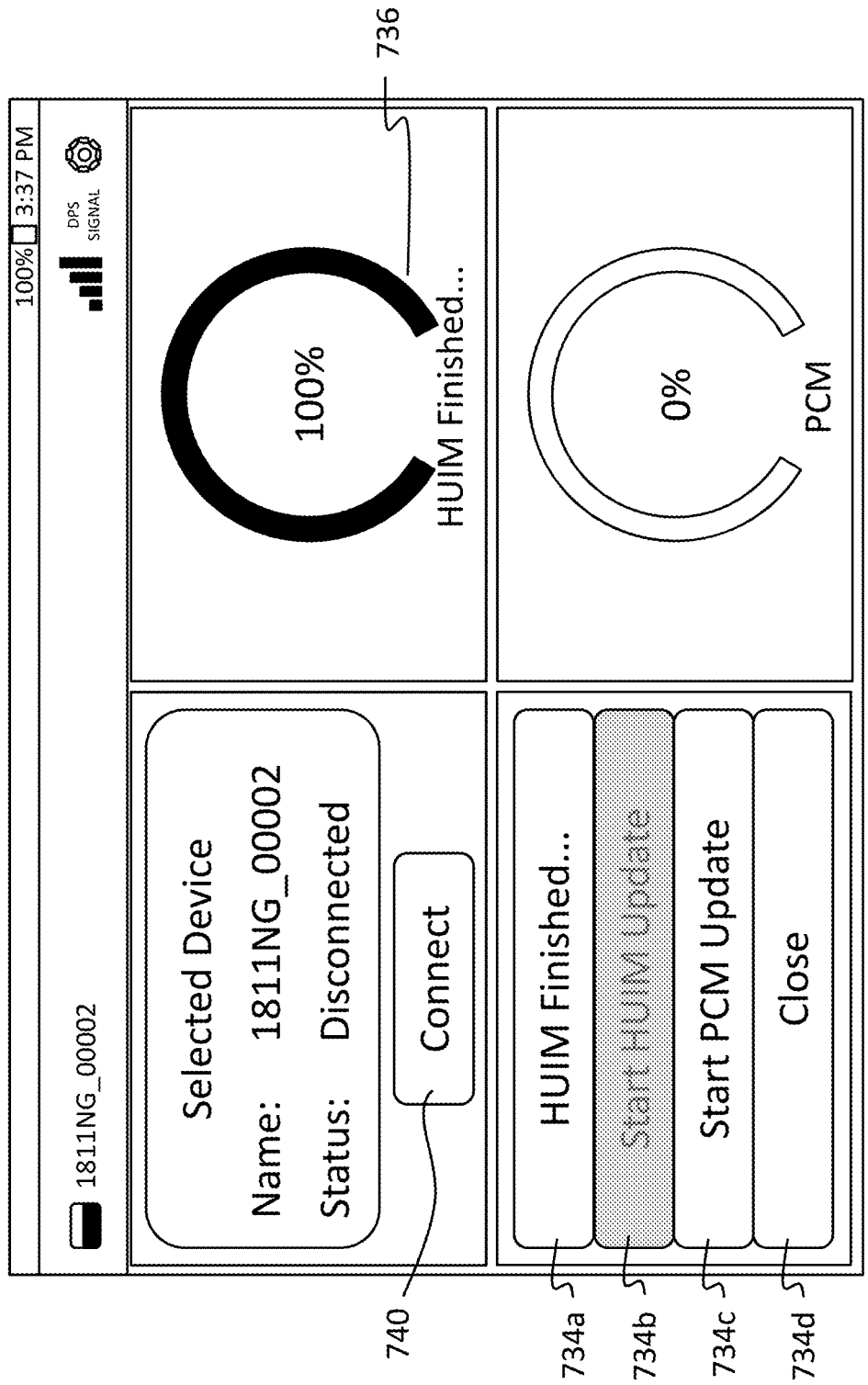
FIG. 7E1

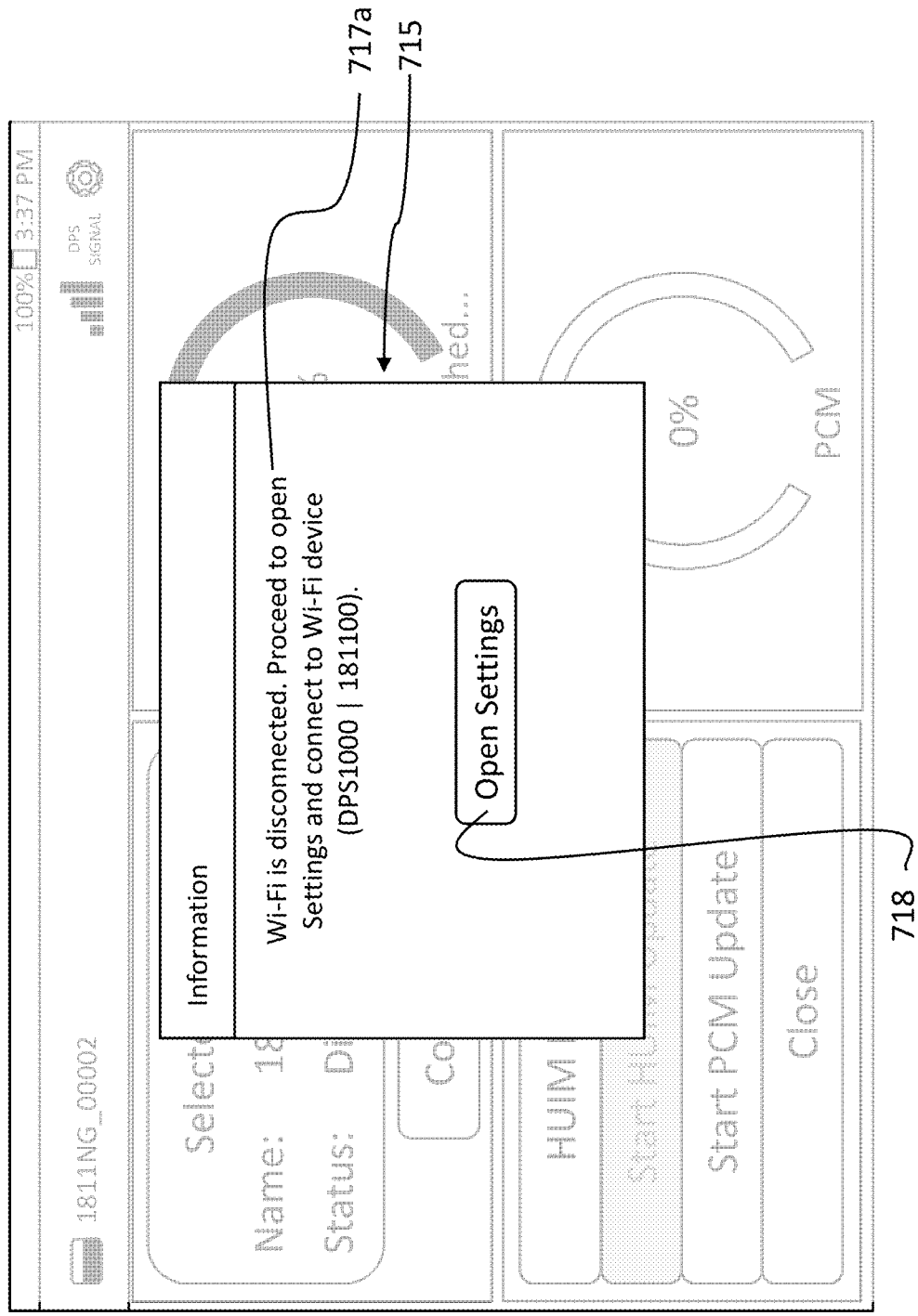
FIG. 7E2

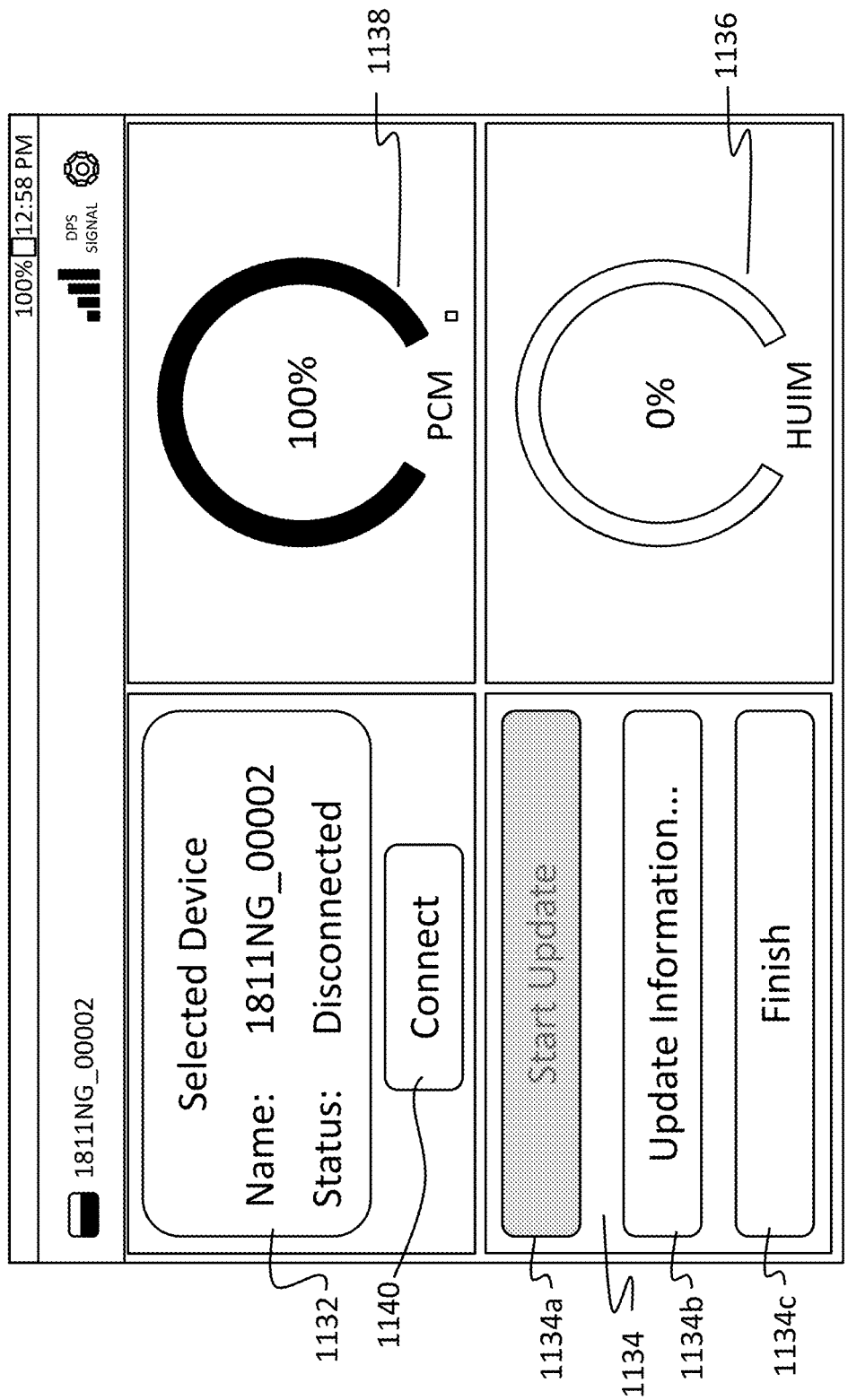
FIG. 11C1

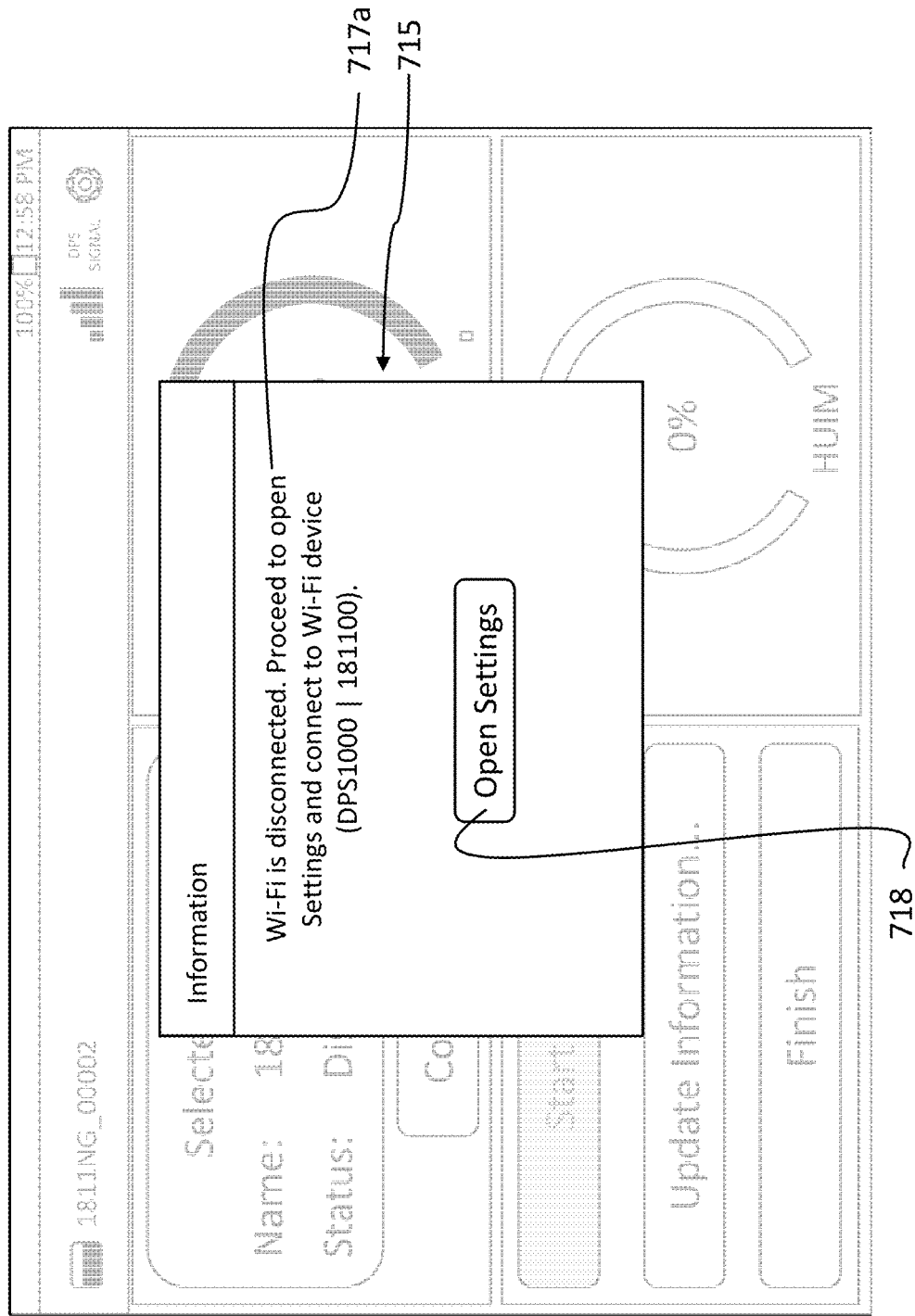
FIG. 11C2

REMOTE APPLICATION UPDATE OF MEASUREMENT DEVICE FIELD FIRMWARE

RELATED APPLICATIONS

This application claims the benefit of U.S. Provisional Patent Application Ser. No. 62/406,641, filed Oct. 11, 2016, titled Remote Application Update Of Measurement Device Field Firmware, the entire contents of which are hereby incorporated by reference.

TECHNICAL FIELD

This disclosure generally relates to instrument measurement devices, including devices for aircraft instrument testing and calibration, and more particularly to remote update, operation, and monitoring of instrument measurement devices.

BACKGROUND OF THE INVENTION

Measurement devices may include any equipment that acquires or generates a signal and/or data related to a measured parameter such as altitude, speed, volume, temperature, pressure, vacuum, voltage, current, resistance, distance, and the like. These measurements may be viewed and analyzed in the time or frequency domain, or the measurement may be static. For a measurement device such as a pneumatic controller, measurements may be taken over a specified altitude or speed and reported as a pressure value in ft. or a rate of climb (ROC) in ft./min. The pneumatic controller may comprise a display screen for visually presenting measurement data. For many applications, it may be advantageous to analyze, generate, store, and share the measurement data.

SUMMARY OF THE INVENTION

The present disclosure is directed to instrument measurement systems and methods for remotely updating and operating the firmware or other software of an instrument measurement device.

Aircraft, including fixed-wing and rotary-wing aircraft, may require ground support such as airframe maintenance, engine overhaul, and repair and supply of components. To perform troubleshooting, maintenance, and repair, ground support personnel utilize ground support test equipment (GSTE). GSTE devices and systems may include, but are not limited to: Air Data/Pitot-Static testers, Reduced Vertical Separation Minimum (RVSM) Air Data testers, APU testers, Cable Tensiometer testers, Fuel Quantity testers, Pressure testers, Nav/Comm Transponder test sets, Pitot/Static Adapters, and Turbine Temperature testers. Each of these may be used to test and/or calibrate one or more instruments and/or indicators on which aircraft control systems and their operators rely to provide safe and consistent performance.

For example, an aircraft's Pitot-static system may be used to obtain critical flight data. A Pitot-static system may include a Pitot tube, one or more static ports which extend through the skin of the aircraft, and instruments and indicators which operate via the principles of air pressure gradients to detect speed, altitude, and other flight parameters.

Pitot tubes may be employed to measure flow velocity in a fluid. When placed pointing directly into the fluid flow, the fluid enters an opening at the front of the tube and stagnates. Highly accurate pressure sensors within the Pitot tube may measure the resulting pressure.

Static ports may include flush-mounted holes on an aircraft's fuselage or in other locations relatively undisturbed by surrounding air flows. One or more tubes may connect a static port to one or more indicators such that pressure information acquired by the static port may be used in combination with pressure information acquired by a pitot tube to derive useful information during flight. Such flight information may be recorded and/or transmitted as flight data. Pitot tubes and static ports may be combined in a single device known as a pitot-static tube comprised in a pitot-static system.

An air data test set (ADTS) is an example of ground support test equipment (GSTE). More generally, an ADTS is an example of a measuring equipment. An ADST may perform two basic functions: (1) it may provide means to leak test an aircraft's pitot-static system; and (2) it may simulate pressure and vacuum conditions required to calibrate airspeed indicators, altimeters, vertical speed indicators, manifold pressure indicators, engine pressure ratio (EPR) indicators, and other information capture and display devices and systems.

Measurement devices, including GSTE, may comprise combinations of mechanical, electro-mechanical, electrical, electronic, digital, microcomputer, and digital storage components including computer memories. More generally, compute devices include machines having a digital controller, a memory, a communications bus, inputs, and outputs. Compute devices also include machines further having one or more of: an electrical power supply, a digital storage medium, a network adapter, or a human interface.

Various embodiments in accordance with the present disclosure may include a measurement device and a receiving device (remote from the measurement device). In some embodiments, the measurement device comprises: (i) a data acquisition/generation component, (ii) a controller, software and (iii) a communication module. In some embodiments, the measurement device comprises a data acquisition/generation component that is programmed to measure and generate data corresponding to one or more pre-defined measurements. A controller, such as a printed circuit board (PCB), may be configured to receive pressure data from a pressure pump component and process the pressure data into a pneumatic signal. A measurement device may also include a wireless communication module adapted to transmit the signal. The receiving device may include a transceiver to receive the signal and a processor to convert the signal into data. The receiving device may further include a display screen to display the digital data.

BRIEF DESCRIPTION OF THE DRAWINGS

Various aspects of the claimed invention are next discussed with respect to non-limiting embodiments shown in the attached figures, wherein:

FIG. 7A1 is a view of a graphical user interface (GUI) according to an embodiment.

FIG. 7A2 is a view of a GUI according to an embodiment.
FIG. 7A3 is a view of a GUI according to an embodiment.
FIG. 7A4 is a view of a GUI according to an embodiment.
FIG. 7A5 is a view of a GUI according to an embodiment.
FIG. 7B1 is a view of a GUI according to an embodiment.
FIG. 7B2 is a view of a GUI according to an embodiment.
FIG. 7B3 is a view of a GUI according to an embodiment.
FIG. 7E1 is a view of a GUI according to an embodiment.
FIG. 7E2 is a view of a GUI according to an embodiment.

FIG. 11C1 is a view of a GUI according to an embodiment.
FIG. 11C2 is a view of a GUI according to an embodiment.

DETAILED DESCRIPTION

Measurement systems and methods for operating a measurement system are disclosed. A variety of embodiments may include a measurement device and a receiving device remote from the measurement device. In some embodiments, the measurement device encompasses a data generation component that is configured to analyze and generate data corresponding to one or more measurements. A CPU and a controller (e.g., printed circuit board or PCB) may be configured to generate and process data from the data generation component and process the data into a communication signal. Additionally, in some embodiments the measurement device may encompass a wireless communication module designed to transmit a measurement signal (e.g., a pneumatic signal), and a display screen. The receiving device may contain a transceiver to receive a measurement signal and a display to display the signal. The receiving device may also generate commands to update the measurement device software (e.g., Human Interface Module (HUIM) firmware and Pneumatic Controller Module (PCM) firmware). Additionally, the receiving device may encompass a user interface to control display screens to display the data. In some embodiments, multiple receiving devices are used.

Figure 1:
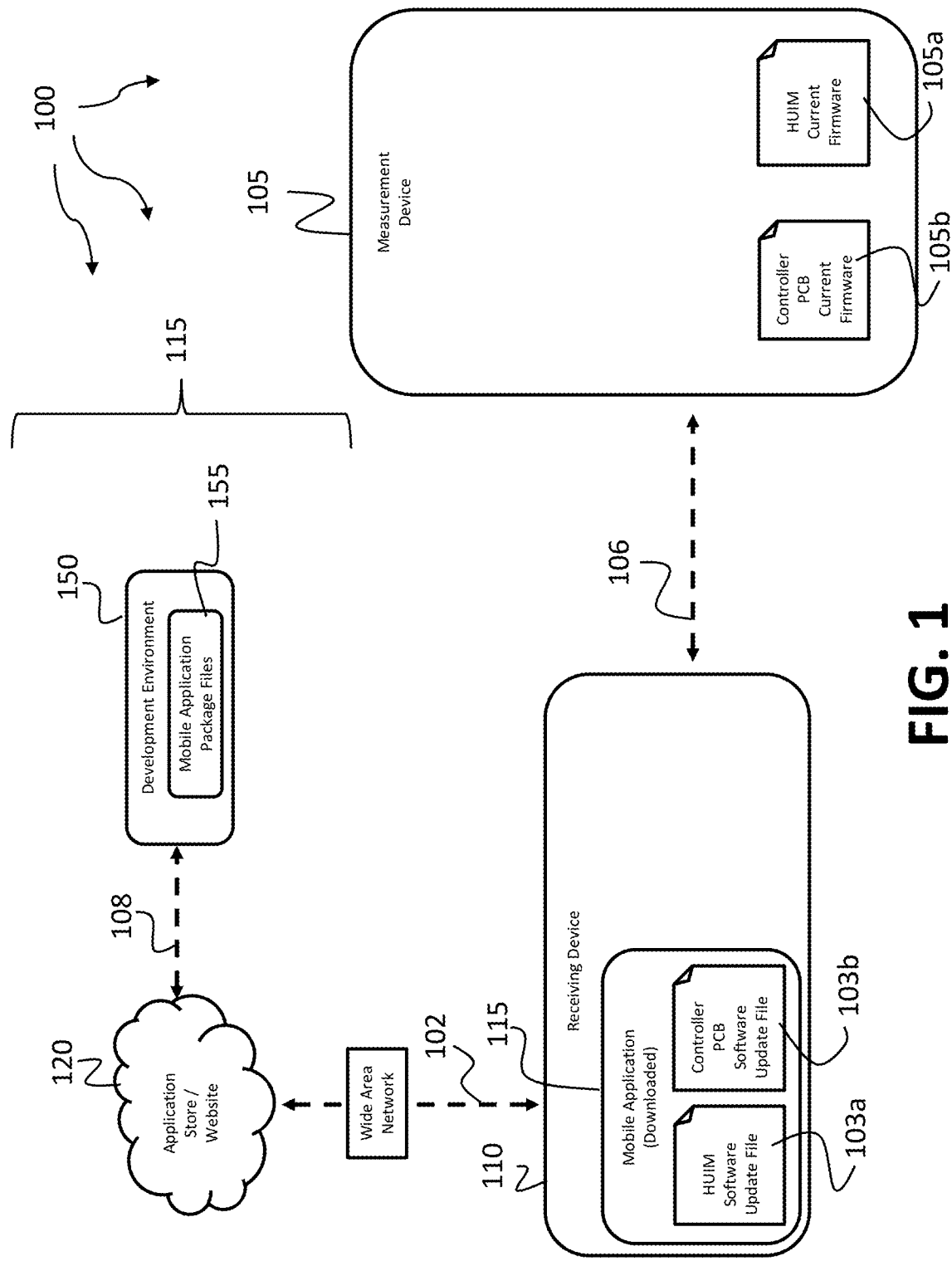
FIG. 1 is a schematic diagram of a measurement system according to an embodiment.

FIG. 1 schematically illustrates an exemplary measurement system 100, generally comprising a measurement/generation device (measurement device) 105, a receiving device 110, and a mobile application 115. In some embodiments, the measurement device 105 is any type of electronic or pneumatic measuring device. In other embodiments, the measuring device takes environmental measurements. For example, the measuring device 105 may be a pneumatic controller, a multimeter, a capacitance meter, a thermometer, a barometer, a hygrometer, or a current or voltage source. Many different types of measurement devices can benefit from being part of the measurement system 100.

Figure 8:
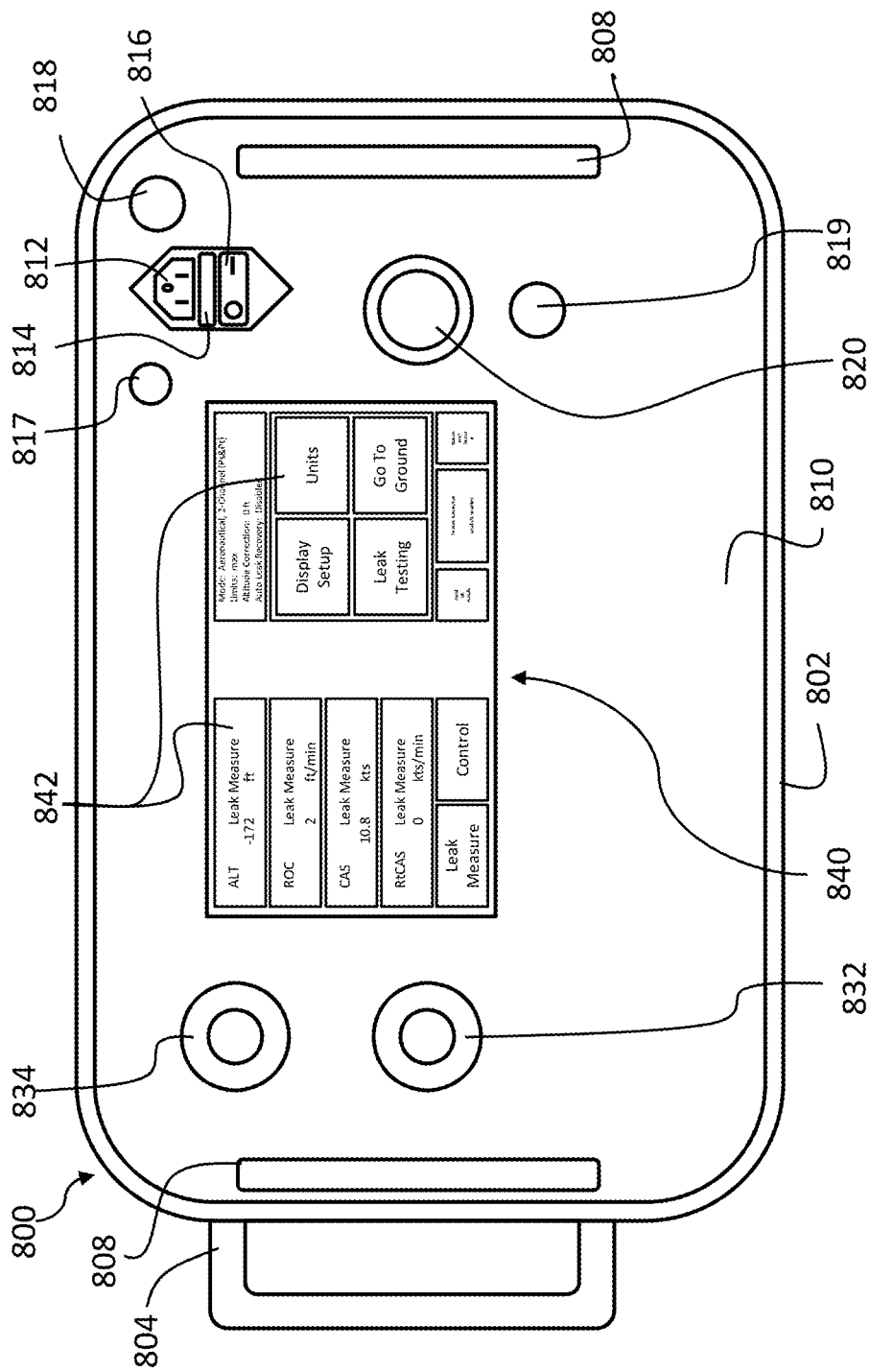
FIG. 8 is a plan view of a test set according to an embodiment.

For example, referring to FIG. 8, a reduced vertical separation minimum (RVSM) Pitot-static test set 800 is exemplary of the measurement device 105 in accordance with various embodiments. The Pitot-static test set 800 is contained in a rugged housing 802 having one or more handles 804. One face of the measurement device 800 includes a front panel 810, from which handles 808 protrude. On the front panel 810 are mounted a power input 812, a fuse holder 814 for holding one or more fuses, and a power switch 816, by which AC input power may be supplied to a power supply housed in the rugged housing 802. Also mounted on the face plate 810 are an antenna connector 817, a ground stud 818, an auxiliary serial (micro USB) connector 819, and a universal serial bus (USB) connector 820. The face plate 810 includes a Pitot pressure (Pt) port 832 and a static pressure (Ps) port 834. The face plate 810 also includes a touch screen display 840.

In an embodiment, a measurement device 105, for example the test set 800, may be operable in two pneumatic control modes of operation, (1) a default mode: 2-channel (Ps and Pt) mode and (2) a 1-channel: Pt-only mode which the user can select by following a sequence of menu selections. In an embodiment, the test set 800 when powered on after an initialization process has completed is always configured into the default 2-channel (Ps and Pt) mode.

In various embodiments, the 2-channel mode may be the configuration used while working with aircraft Pitot-Static systems and aeronautical instruments. In an embodiment, in the 2-channel mode the static (Ps) port is used to measure and simulate altitude (ALT) equivalent pressures while the Pitot (Pt) port is used to measure and simulate calibrated airspeed (CAS) equivalent pressures. In various embodiments, the displayed value for pressure altitude ALT (in feet or meters) is computed based on a barometric setting of 29.9213 inHg (1013.25 mb). In some embodiments, the barometric setting cannot be changed.

In some embodiments, the Pt-only mode can be used to drive an airspeed or Mach indicator that has its static (Ps) port left vented to ambient (local barometric pressure). In an embodiment, when the single channel Pt-only mode is selected, the test set 800 will perform a Go To Ground function before transitioning into the Pt-only mode, to ensure the static (Ps) port is at ambient barometric pressure, and at the conclusion of the Go To Ground function, the test set 800 will leave the static (Ps) port vented to ambient pressure while driving the Pitot (Pt) port to a target pressure specified by the user.

In various embodiments, a measurement device 105, for example the test set 800, may be operated to perform useful measurements, tests, or calibrations. In various embodiments, the measurement device 105 operates to perform instrument measurements including leak testing, automatic leak testing, altitude (ALT) and calibrated airspeed (CAS) testing, aircraft static system testing, aircraft Pitot system testing, mach testing, constant mach testing, airspeed switch testing, and engine pressure ratio (EPR) testing. In an embodiment, in operating the measurement device 105 to perform one or more such tests, a user instructs the measurement device 105 to output a signal (e.g., an air pressure supplied via a hose connected to an instrument to be tested) at a target value. In some embodiments, an output level of the signal produced by the measurement device 105 corresponds to a predetermined calibration standard. Thus, in accordance with various embodiments, the output of the measurement device 105 is a calibration signal supplied as an input to an instrument to be calibrated, and the instrument is adjusted (e.g., calibrated) to reduce error in the instrument's readings. In an embodiment, the instrument measurement device 105 produces a calibration signal, specifies a target value of the calibration signal, and delivers the calibration signal to an input of the instrument to be measured and/or calibrated.

While the measurement device 105 is discussed herein with respect to measuring, testing, and/or calibrating pneumatic instruments by producing and/or measuring pneumatic signals, embodiments of measuring equipment in accordance with the invention are not limited to equipment that acquires or generates a pneumatic signal, but may include any machine that acquires or generates a signal and/or data related to a measured parameter such as altitude, speed, volume, temperature, pressure, vacuum, voltage, current, resistance, distance, and the like.

Referring again to FIG. 1, successive software and firmware versions may be propagated from a development environment 150 in the form of mobile application files 155. In some embodiments, the mobile application files 155 are transmitted by a connection 108 to the application store/website 120. The mobile application 115 installed on the receiving device 110 includes all necessary software code not only to operate the receiving device 110, but moreover, to update any software or firmware (e.g., 105a, 105b) of the measurement device 105 from a current version (Rc) to an updated version (Ru) (see FIG. 6C).

Still referring to FIG. 1, in various embodiments, the measurement device 105 generates data, either analog or digital, representing a parameter being measured or generated. For example, the measurement device 105 may produce a pneumatic signal in the form of pressure or vacuum. Referring again to FIG. 8, the Pitot-static test set 800 includes one or more highly reliable electric pumps by which vacuum and pressure are supplied at the Pitot pressure (Pt) port 832 and at the static pressure (Ps) port 834.

Referring now to FIGS. 9A to 9D, to assure proper calibration and performance of various aircraft instruments and systems, a Pitot pressure hose 107a may connect the Pitot pressure (Pt) port 832 to a Pitot probe 113a of an aircraft 111 and a static pressure hose 107b may connect the static pressure (Ps) port 834 to a static port 113b of the aircraft 111. In various embodiments, pressures and vacuums may thus be supplied to the aircraft's Pitot-static system by the measurement device 105 to simulate physical conditions the aircraft 111 may encounter in operation (i.e., during take-off, flight, and landing). During testing, an operator may monitor and compare values of parameters indicated by the aircraft's onboard instruments and systems with calibrated values known to be generated by the measurement device 105 (e.g., Pitot-static test set 800). Such tests may be performed, for example, while the operator is seated in a cockpit of the aircraft 111, a location that is remote from both the Pitot probe 113a and the static port 113b. Thus, it may be desirable for the receiving device 110 to be operated from a location inside the aircraft 111 while the measurement device 105 is located outside the aircraft 111. In other embodiments, such tests may be performed on one or more aircraft components after removal from the aircraft or prior to installation on the aircraft. In an embodiment, the pressure or vacuum in the measurement device 105 may be limited to a predetermined range, such as 0-50,000 ft., and the measurement device 105 may register an altitude value proportional to the parameter being monitored.

Figure 9:
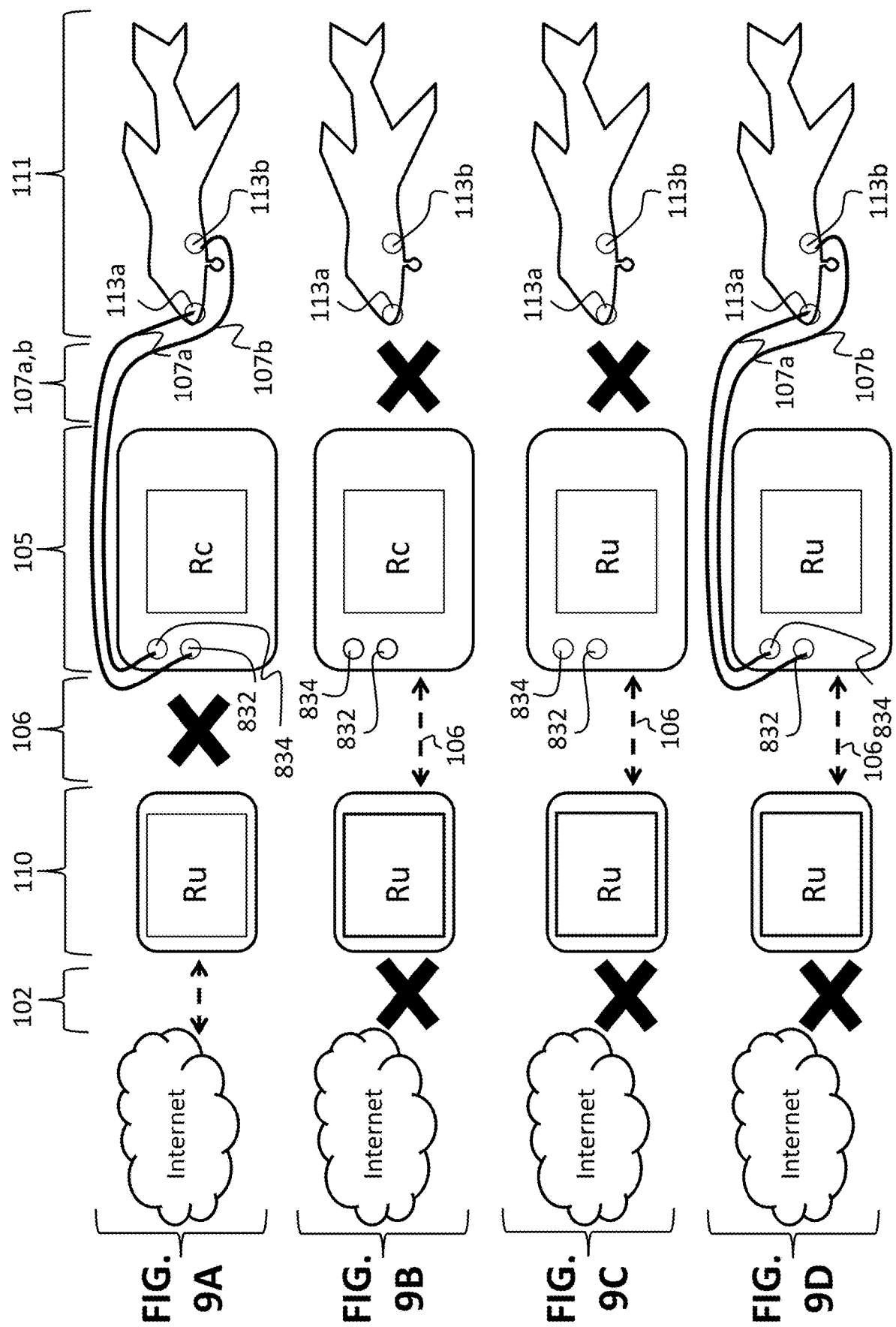
FIG. 9A is a simplified schematic according to an embodiment.
FIG. 9B is a simplified schematic according to an embodiment.
FIG. 9C is a simplified schematic according to an embodiment.
FIG. 9D is a simplified schematic according to an embodiment.

In FIG. 9A, the receiving device 110 is connected to the Internet by WAN connection 102. The receiving device 110 is running the mobile application 115, which includes software version Ru for the measurement device 105. However, as shown by the X between the receiving device 110 and the measurement device 105, there is no wireless connection between them. Moreover, the receiving device 105 has software version Rc. The receiving device 105 is, however, connected to the aircraft 111 by the Pitot pressure (Pt) hose 107a and the static pressure (Ps) hose 107b. Notably, in some embodiments, the measuring device 105 is capable of being operated locally. Thus, although the measurement device 105 and the receiving device 110 are running incompatible software versions, the measurement device 105 nonetheless can function in some respects, albeit without the benefit of remote operation via the receiving device 110.

In FIG. 9B, the WAN connection 102 is disconnected, as shown by the X between the Internet and the receiving device 110. The receiving device 110 is running the mobile application 115, which includes software version Ru for the measurement device 105. The receiving device 110 and the measurement device 105 are connected by a wireless connection 106. The receiving device 105 is isolated from the aircraft 111, as shown by the X between them, no longer being connected by pneumatic hoses, electrical connections, or any other channel of communication. The measurement device 105 is still running the outdated software version Rc. Thus, in accordance with some embodiments, a software update will be required in order for the receiving unit 110 to be able to control the measuring device 105 by remote operation.

In some embodiments, the receiving device 110 displays a notification with instructions to disconnect from the WAN connection 102 before forming the wireless connection 106. In other embodiments, upon initiating formation of the wireless connection 106, the receiving device automatically disables the WAN connection 102. In still other embodiments, the receiving device 110 is automatically prevented from connecting to the wireless connection 106 until after the WAN connection 102 has been closed.

In some embodiments, one or both of the measurement device 105 and the receiving device 110 displays a notification to verify whether the instrument measurement device is connected to an instrument to be tested. According to some embodiments, the notification includes instructions to isolate the measurement device 105 from the aircraft 111 by disconnecting the hoses 107a, 107b prior to formation or upon initiating formation of the wireless connection 106. In other embodiments, the receiving device 110 is automatically prevented from forming the wireless connection 106 with the measurement device 105 until after the hoses 107a, 107b have been disconnected from the aircraft 111. In some embodiments, the hoses 107a, 107b need not be disconnected from the measurement device 105, it being sufficient that they are disconnected from the aircraft 111. In some embodiments, means for automatically detecting a connection state of the hoses 107a, 107b is provided, to prevent the hoses 107a, 107b from remaining connected to the aircraft 111 during a software update process of the measurement device 105. In various embodiments, such means include pressure sensors, electrical sensors, and contact switches. For example, in an embodiment, the measurement device 105 distinguishes between a hose-connected state and a hose-disconnected state based on an air pressure measured in the measurement device 105, e.g., due to a back-pressure imposed by the Pitot pressure (Pt) port 832 and/or by the static pressure (Ps) port 834. Thus, according to various embodiments, the processor 230 executes the application program 115, whereby a verification of isolation of the measurement device 105 from an instrument to be measured (such as the Pitot-static system of the aircraft 111) is automatically triggered.

In FIG. 9C, the WAN connection 102 is disconnected, as shown by the X between the Internet and the receiving device 110. The receiving device 110 is running the mobile application 115, which includes software version Ru, and the measurement device 105 is also running the updated software version Ru, it having been provided by the mobile application 115 via the wireless connection 106. The receiving device 105 is isolated from the aircraft 111, as shown by the X between them, no longer being connected by pneumatic hoses, electrical connections, or any other channel of communication.

In FIG. 9D, the WAN connection 102 is disconnected, as shown by the X between the Internet and the receiving device 110. The receiving device 110 is running the mobile application 115 and the measurement device 105 is running the updated software version Ru. The receiving device 110 and the measurement device 105 are connected by the wireless connection 106 and the measurement device 105 is connected to the aircraft 111 by the Pitot pressure (Pt) hose 107a and the static pressure (Ps) hose 107b. In this configuration, a user interface of the receiving device 110 mirrors a user interface of the measurement device 110, in accordance with various embodiments. For example, the receiving device 110 may remotely control operation of the measurement device 105 during one or more tests of instruments comprised in the aircraft 111.

The measurement device 105 in various embodiments processes and transmits measured and generated data to the receiving device 110 through a wireless communication signal. The receiving device 110 may be, for example, a tablet, a laptop, a smartphone, a smartwatch, smart glasses (e.g., Virtual Reality (VR), Augmented Reality (AR) or other), other wearable devices or another mobile device. The receiving device 110 may receive a "mirror" of the same data stored and/or displayed in the measurement device 105. Moreover, in various embodiments, all aspects of the operation of the measurement device 105 may be displayed and controlled through a display of the receiving device 110 that mirrors that of the measurement device 105. For example, referring again to FIG. 8, in various embodiments the touch screen display 840 presents a graphical user interface (GUI) 842 to the operator. In some embodiments, the only physical switch used to operate the test set 800 is the power switch 816. Thus, the GUI 842 presented on the touch screen display 840 is used to display and control all aspects of the operation of the test set 800.

In some embodiments, the measurement device 105 may receive a firmware update via a direct physical connection to an external storage device. For example, referring again to FIG. 8, the USB port 820 may provide access for firmware updates provided via a USB storage device. Referring again to FIG. 1, in some embodiments, the receiving device 110 comprises a mobile application 115 that includes package files designed to communicate and trigger field firmware updates for the measurement device 105. The mobile application 115 may, for example, be acquired or downloaded from an application store or website 120 via a wide area network (WAN) connection 102. Thus, in some embodiments, the receiving device 110 may wirelessly trigger and deliver a firmware update to the measurement device 105.

Figure 2:
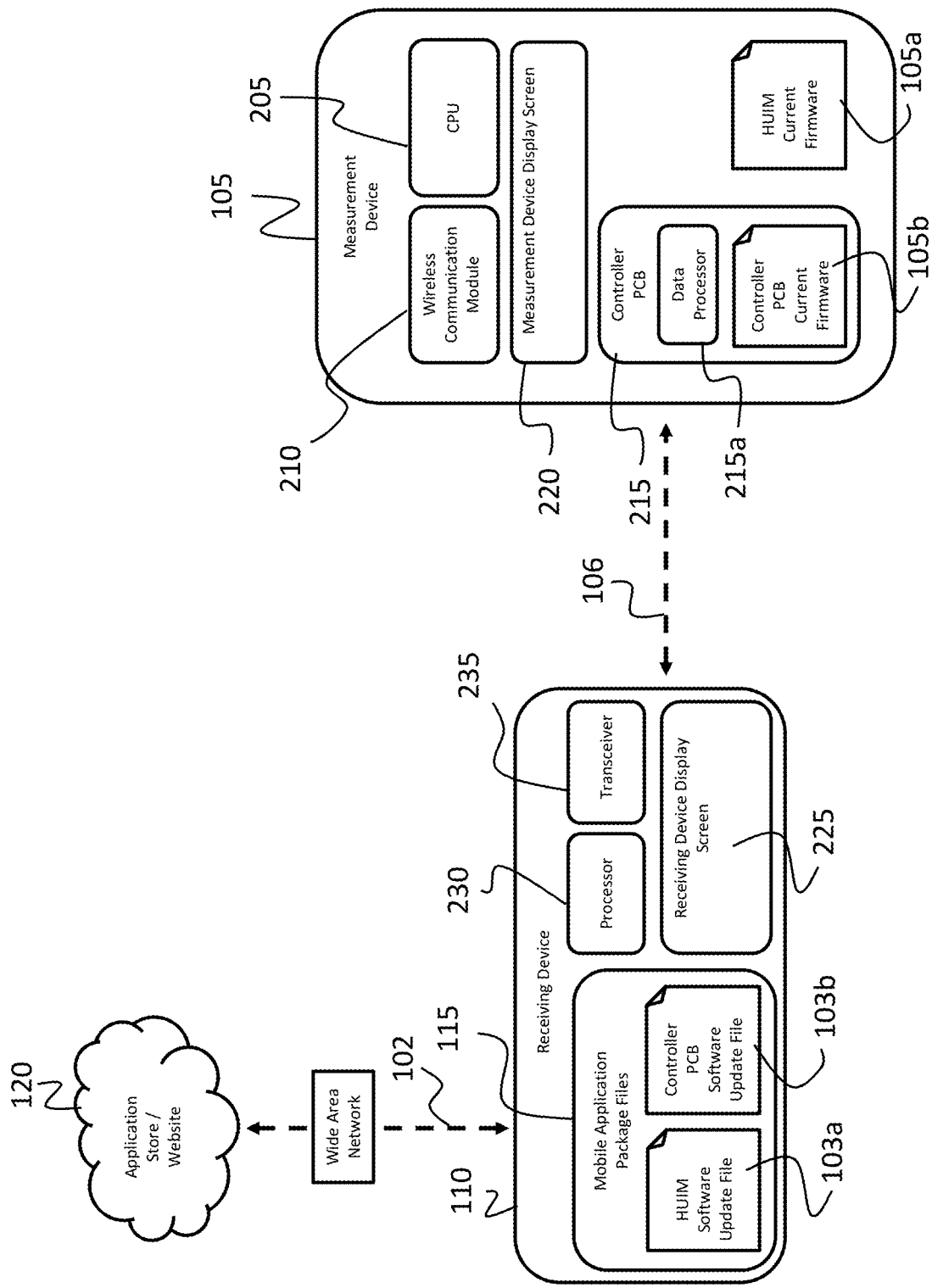
FIG. 2 is a system diagram.

FIG. 2 illustrates the schematic of an overall system diagram comprising the exemplary measurement device 105 and the exemplary receiving device 110. In many embodiments, the measurement device 105 generally includes a controller such as a controller PCB 215. The controller PCB 215 may receive data during a measurement event. In some embodiments, the controller PCB 215 includes a data processor 215a to execute a sequence of stored data and/or instructions. The exemplary measurement device 105 further includes a CPU 205 that is separate from the data processor 215a of the controller PCB 215. In some embodiments, the various components of the measurement device 105 are interconnected via a measurement device system bus (not shown). Likewise, in some embodiments, the various components of the receiving device 110 are interconnected via a receiving device system bus (not shown). One or both of the measurement device 105 and the receiving device 110 may include a digital storage device, including, without limitation, a hard disk, a floppy disk, a solid state drive, a removable memory stick, or an optical storage device. The CPU 205 may assist in processing and storing data received from the controller PCB 215. The received data may be digitally processed and converted into a communication signal that is sent to a measurement device display screen 220. Additionally, the measurement device 105 may encompass a wireless communication module 210. In one embodiment, the wireless communication module 210 transmits pressure and vacuum data for display on the display screen 220. The wireless communication module 210 may help establish wireless connectivity, such as the wireless connection 106, between the measurement device 105 and the receiving device 110. For example, when a user enters a command into the measurement device 105, the wireless communication module 210 may transmit corresponding data to achieve a desired airspeed value of 150.0 knots, which indicates the current pressure value at Pitot output (e.g., Pitot pressure port 832) in knots. In another example, when the user enters a command in the receiving device 110, the wireless communication module 210 may receive corresponding data to control the measurement device 105 to achieve the desired airspeed value of 150.0 knots, which indicates the current pressure value at Pitot output (e.g., Pitot pressure port 832) in knots.

Figure 3A:
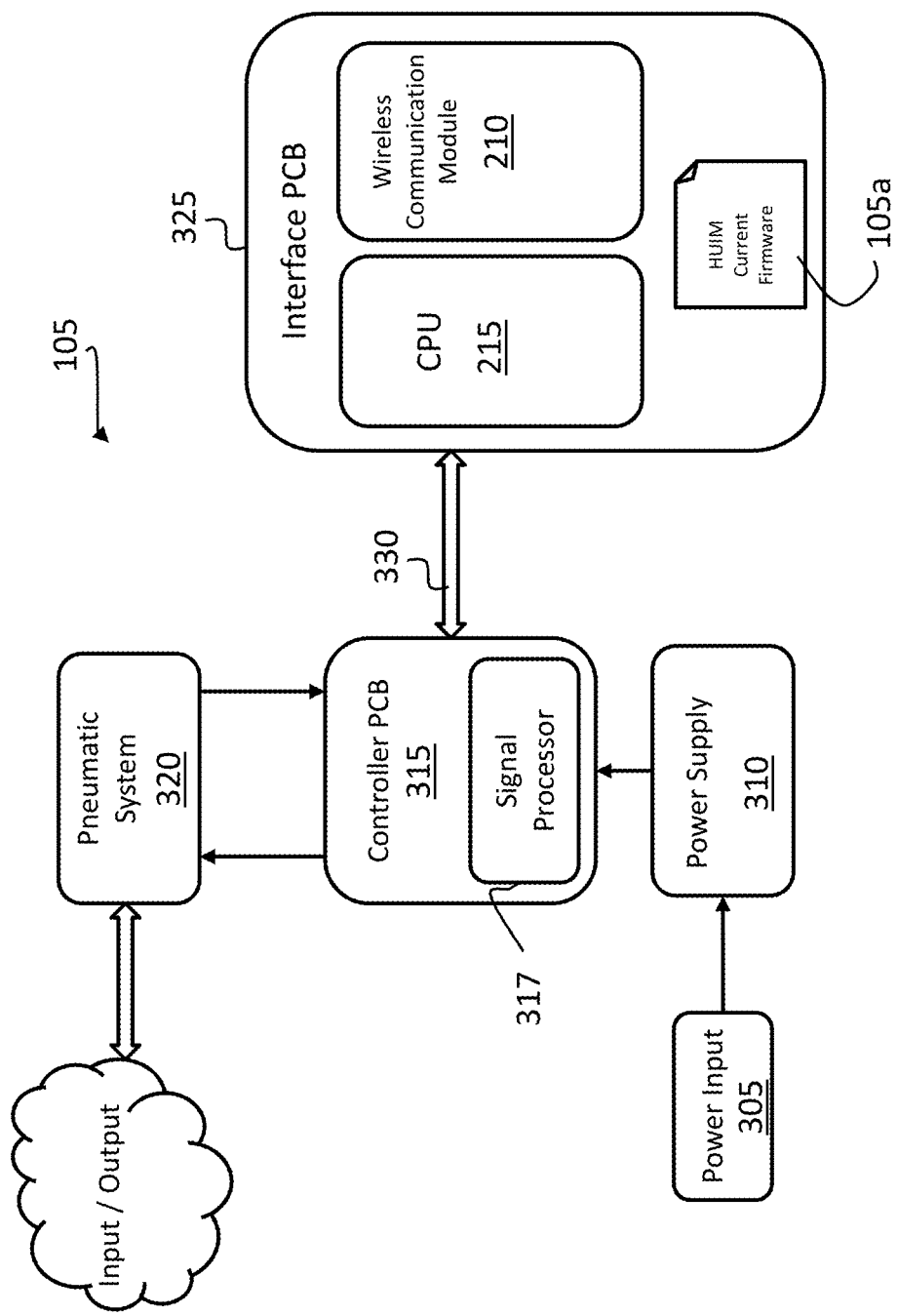
FIG. 3A is a schematic diagram of the measurement device.

FIG. 3A is a schematic diagram of an exemplary measurement/generation device 105. In this type of embodiment, the power input 305 may comprise a pneumatic system module containing Inlet Protection class I type of entry and may be equipped with a Line Switch (2-pole), a Fuse holder for fuse-links 5×20 mm and a Line filter to reduce noise. The power supply 310 converts the universal AC input power into a lower DC voltage that is used for the rest of the assemblies. The pneumatic system 320 includes sensors and valves (not shown) that are connected to a controller PCB 315. In one embodiment, the controller PCB 315 reads the pneumatic system 320 sensors every fraction of a second (e.g., 0.10, 0.20, 0.25, 0.33 seconds) and sends the data to an interface PCB 325 using the Controller Area Network (CAN) link 330. This sensor data is communicated for later display. In many embodiments, the controller PCB 315 works in pressure units (the base unit) for the instrument. The controller PCB 315 may include a signal processor 317. For example, a 32-bit digital signal processor can be used, which supplies all or almost all of the processing needs of the controller PCB 315. In some embodiments, the controller PCB 315 drives the vacuum and pressure pumps using solid state relays. The controller PCB 315 also checks the pressure out of a regulator (see, e.g., 360 in FIG. 3B).

In some embodiments a separate device or board (e.g., interface PCB) is used to perform interface functions. In the embodiment shown in FIG. 3A, the interface PCB 325 implements the user interface using a touch screen and a graphics panel. The current mode of operation information (leak measure or control) is sent to the controller PCB 315. If in control mode, the current aim points (e.g., altitude or airspeed) are sent across. The interface PCB 325 receives the current pressures from the controller PCB 315. The current pressures are then converted into the appropriate units for display. In an embodiment, the interface PCB 325 contains the wireless communication module 210 (e.g., Wi-Fi or Bluetooth module) that permits communication with the application 115 of the receiving device 110.

In some embodiments, the pneumatic system 320 generates all pressures and vacuums that the measurement/generation device 105 requires. In addition, the pneumatic system 320 includes all the sensors required to measure the external pressures and vacuums, internal pressures and vacuums, and external/internal pressures and vacuums, and passes information to the controller PCB 315.

Figure 3B:
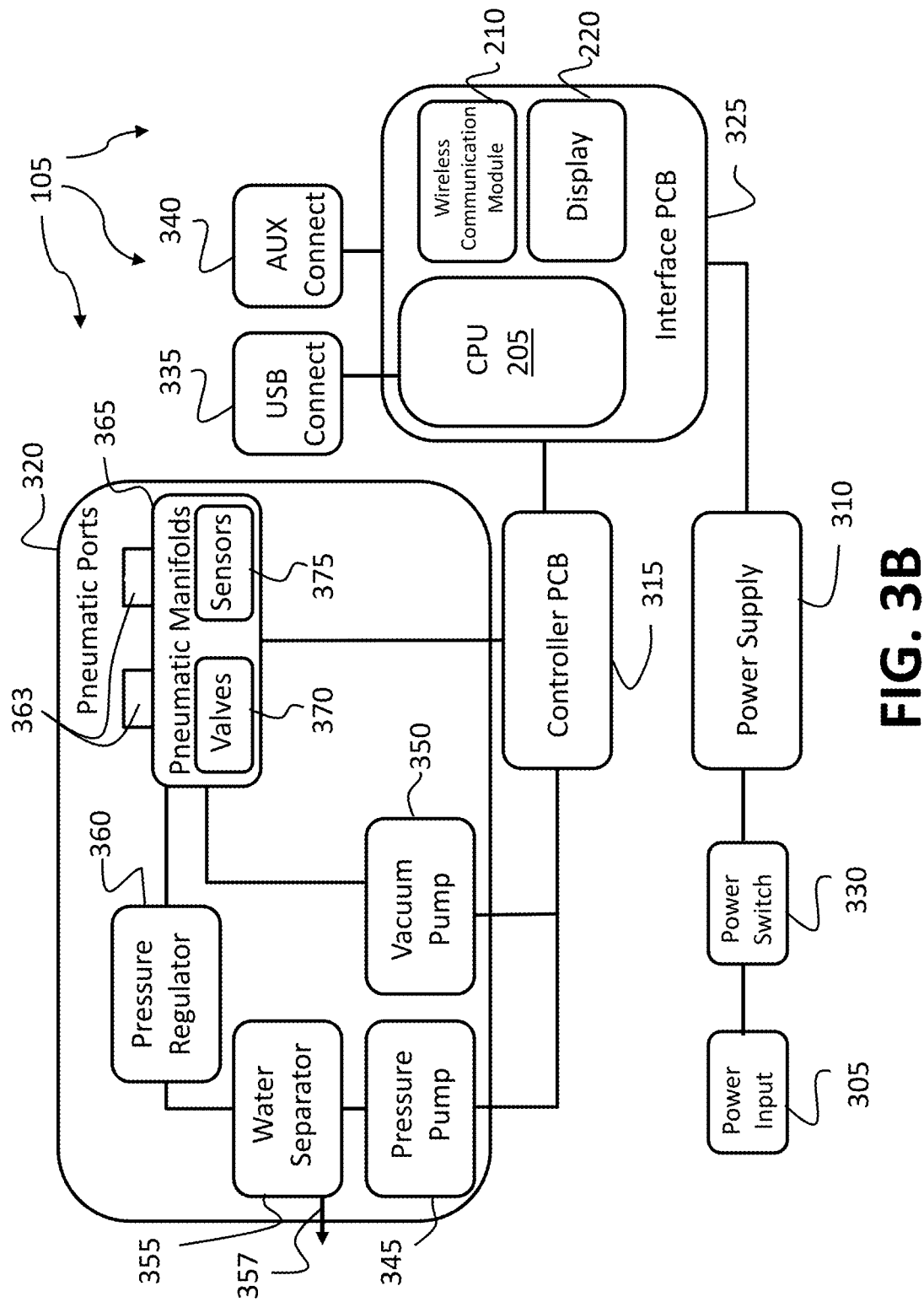
FIG. 3B is a schematic circuit diagram of the measurement device

FIG. 3B is a detailed diagram of a measurement/generation device 105 used as an example. The exemplary pneumatic system 320 displayed is composed of several pneumatic components, for example, pneumatic ports 363, pneumatic manifolds 365, etc.

In the exemplary pneumatic manifolds 365, reside several components of the pneumatic system 320, such as valves 370 (proportional and digital), sensors 375, internal volumes and flow restrictors that are incorporated into each channel to limit the maximum flow that can be achieved when power is lost.

In the exemplary pneumatic system 320, a two channel design is used. One channel applies pressure by a pressure pump 345 and the other channel applies vacuum by a vacuum pump 350 to the volume being controlled. In one embodiment, there are two proportional valves 370 per channel. A proportional valve works by having a change in current vary a magnetic field in the valve, which varies the travel or distance the valve is opened. Other types of valves may also be used.

In some embodiments, there may be one output valve per measuring/controlling channel. Large orifices on these valves may result in a smaller pressure drop across the valve 370 when high rates are demanded. Additionally, there are two highly accurate pressure sensors 375 on the unit, one for each channel.

The exemplary measurement/generation device 105 of FIG. 3B has two pumps installed. One is used as the pressure pump 345 and one is used as the vacuum pump 350. Note that the pumps 345, 350 are only operated when the unit is in generation mode. Mufflers (not shown) may be installed on both pumps to minimize noise. The pumps have enough capacity to manage the water separation system waste pressure to eliminate water condensation.

The output from the pressure pump 345 connects to a heat exchanger, and a pressure regulator 360. A water separator 355, takes entrained water vapor, condenses it within this assembly, and expels the water out of the pneumatic system 320 via a dump valve 357.

Figure 4:
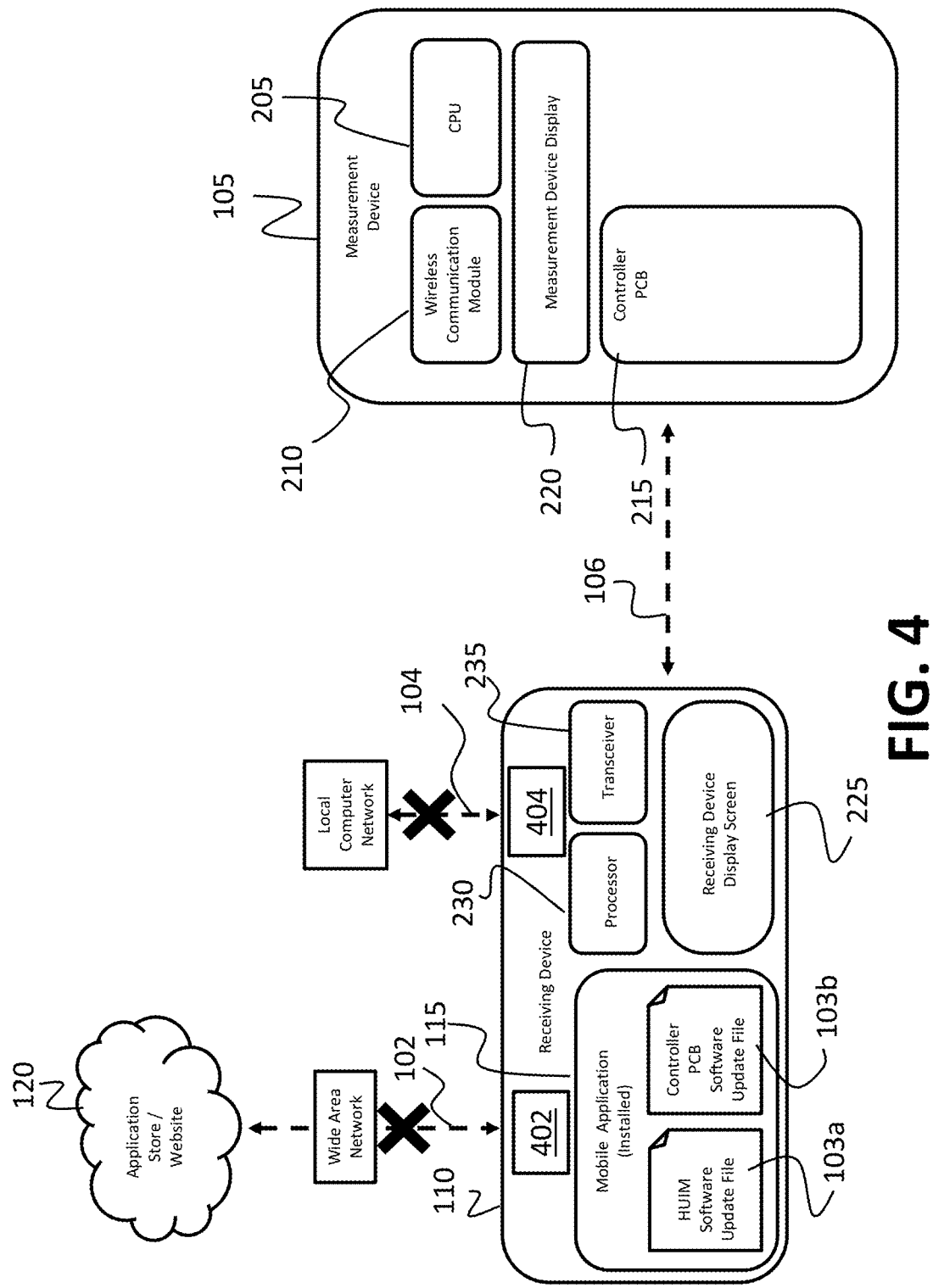
FIG. 4 is a schematic diagram of the receiving device system

Referring to FIG. 4, various embodiments of the receiving device 110 may comprise a transceiver 235. The transceiver 235 may receive the signal transmitted by the wireless communication module 210 of the measurement device 105 via the wireless connection 106. The wireless connection 106 is an example of a wireless link. A processor 230 may convert the signal into digital data, such that the data may be visually displayed on a display screen 225 of the receiving device 110.

FIG. 4 illustrates various embodiments of the receiving device 110 in relation to an update process of the measurement device 105. In various embodiments, the receiving device 110 may be a handheld device such as a tablet computer, a mini-tablet or a smartphone. In many embodiments, the receiving device 110 is connected to a local computer network or local area network (LAN) (for example an intranet, a hot spot, or another wireless device) via a local area network connection 104 formed by a LAN adapter 404. In some embodiments, the receiving device 110 is also connected to a wide area network (WAN) such as the Internet, via a WAN connection 102 formed by a WAN adapter 402. In some embodiments, the WAN connection 102 is operational when downloading the application 115 from the application store or website 120.

In many embodiments, the receiving device 110 allows the user to input commands via a user interface projected on the display screen 225 (See, e.g., FIGS. 7A1 to 7H). The display screen 225 may take various forms including, for example an electronic display or a digital representation that may be touch-sensitive, allowing the user to respond to certain commands by touching the display screen 225. For example, the user, when prompted to update the HUIM firmware 105a, may choose to do so at a later time by touching a corresponding icon (e.g., later soft key 726 in FIGS. 7B1, 7B2, 7B3).

In another embodiment of the receiving device 110, the transceiver 235 may send and receive data that may in turn be processed through the processor 230 and displayed on the display screen 225. The receiving device 110 functionality may be implemented by an operating system.

The update process is a multi-step system. Initially, a mobile application 115 may be downloaded from an application store or website accessible over the Internet, directly to the receiving device 110 or indirectly for later use by the receiving device 110. The downloaded application 115 may be stored, installed, and executed on the receiving device 110. The application 115 may be written in one or more of a variety of programming languages and may include sufficient encoding to operate in conjunction with the operating system of the receiving device 110 on which the application 115 is executed. The application 115 may take advantage of the functionality of the operating system of the receiving device 110 to allow interfacing between different hardware components of the receiving device 110 including the display screen 225, and the transceiver 235 (e.g., for wireless connectivity of the receiving device 110 via the wireless connection 106).

In some embodiments, the receiving device 110 and the measurement device 105 may use a Wi-Fi connection, where the measurement device 105 performs as a Wi-Fi server that allows the receiving device 110 to be used exclusively as a remote control. In some embodiments, the measurement device 105 is only a Wi-Fi server and does not have Wi-Fi client capabilities. Moreover, in one embodiment, the application 115 embedded or operating in the receiving device 110 is set-up so that it can only function when connected to the measurement device 105. In some embodiments, this connectivity is established through a Wi-Fi Direct protocol that allows the transfer of data between the measurement device 105 and the application 115 on the receiving device 110. Wi-Fi Direct, for example, supports the establishment of a peer-to-peer connection that transfers the data directly between receiving device 110 and the measurement device 105.

In some embodiments, Wi-Fi Direct is the only method used to link the measurement device 105 with the receiving device 110. Wi-Fi Direct is a Wi-Fi standard enabling devices to easily connect with each other without requiring a wireless access point. One advantage of Wi-Fi Direct is the ability to connect devices even if they are from different manufacturers. Only one of the Wi-Fi devices needs to be compliant with Wi-Fi Direct to establish a peer-to-peer connection that transfers data directly between them with greatly reduced setup. Wi-Fi Direct negotiates the link with a Wi-Fi Protected Setup system that assigns each device a limited wireless access point. The "pairing" of Wi-Fi Direct devices can be set up to require the proximity of a near field communication, a Bluetooth signal, or a button press on one or all the devices. This arrangement can be used to provide additional security.

In some embodiments, the communication protocol between the application 115 on the receiving device 110 and the measurement device 105 is specifically setup or configured to give the application 115 the ability to completely control all the functions of the measurement device 105. In some embodiments, while connected to the measurement device 105, the receiving device 110 cannot be or is restricted from being connected to another Wi-Fi source, and/or navigating through the wide area network such as the Internet via wide area network (WAN) connection 102, as shown by the X on the WAN connection 102.

Additionally, in one embodiment, launching the application 115 causes the receiving device 110, in conjunction with resident hardware components of the receiving device 110, to establish the wireless connection 106, such as a Wi-Fi connection or Bluetooth connection, with the measurement device 105. In some embodiments, this wireless connection 106 is established automatically after launching the application 115. In some embodiments, connectivity may also be established through a request on a user interface (See, e.g., FIGS. 7A1 to 7H) of the receiving device 110. The application 115 may also establish connectivity with the measurement device 105 for example via Bluetooth or other forms of wireless communication (e.g., radio, satellite, infrared, and other communication methods), available on the receiving device 110 and the measurement device 105. However, in some embodiments connectivity through one wireless method (e.g., Bluetooth, near field communication) will automatically disable any other wireless access point on the receiving device 110, isolating the communication between the receiving device 110 and the measurement device 105. After connectivity is established between the measurement device 105 and the receiving device 110, data and commands may pass between the measurement device 105 and the receiving device 110. In some embodiments, this connectivity is isolated as the receiving device 110 cannot be connected to the Internet, or any other network or device (e.g., as shown by the X on the LAN connection 104 and as shown by the X on the LAN) at the same time it is connected to the measurement device 105.

In some embodiments, the measurement device 105 does not possess the capacity to connect to the Internet at all. Only the receiving device 110 can connect to the Internet when it is not connected to the measurement device 105. Therefore, some embodiments isolate the measurement device 105 from connecting to the Internet, other wide area networks, local networks, and devices. This isolation provides various advantages to the overall system, for example, additional security.

In some embodiments, once the isolated communication is established, the receiving device 110 and the application 115 in the receiving device 110 comprise a command that will trigger a verification of whether the measurement device 105 HUIM and PCM software are compatible with the one embedded in the application 115 in the receiving device 110. In some embodiments, this is an automatically initiated command that will trigger verification of software compatibility, for example compatible versions of code. In some embodiments, this verification may lead to a software upgrade if the measurement device 105 has a software version lower than the receiving device 110, for either HUIM or PCM. The receiving device 110 upgrade version target will be defined by the latest software embedded in the receiving device 110.

For example, once communication is established between the measurement device 105 and the receiving device 110, if the version of the software residing in the measurement device 105 (for HUIM or PCM) is lower (e.g., 3.5) than the one residing in the receiving device 110 (e.g., 4.0), the app automatically triggers a firmware update screen with a message allowing the user to update the firmware immediately or later. In a more particular embodiment, the app requests a line of code (Rc) from the measurement device 105 (See FIG. 6C) and the measurement device 105 transmits its version line of code (Rc) to the receiving device 110, which compares that line of code (Rc) to an updated line of code (Ru) already embedded in the receiving device 110. A comparison is then made of the software versions for HUIM or PCM or both. In some embodiments, user permission is requested prior to updating the firmware for HUIM or PCM. In some embodiments, the software update process may take a few minutes.

After update, the measurement device 105 may restart. The equipment or user may have to re-establish wireless connection between the receiving device 110 and the measurement device 105. Once a wireless connection is re-established between the measurement device 105 and the receiving device 110, the application 115 may take over and display data from the measurement device 110 on its display screen 225. Now, the receiving device 110 is able to control the functionality of the measurement device 105 remotely. Thus, the HUIM of the measurement device 105 may be disabled while the application residing on the receiving device 110 is connected to the measurement device 105. In some embodiments, the data being displayed on the receiving device 110 display screen 225 is identical to the data being displayed on the measurement device 105. Once initial setup is completed, the application may obtain the data transmitted from the measurement device 105 and allow the user to operate, analyze and manipulate the transmitted data solely from the receiving device 110, which will typically mirror the data found on the measurement device 105.

Figure 5:
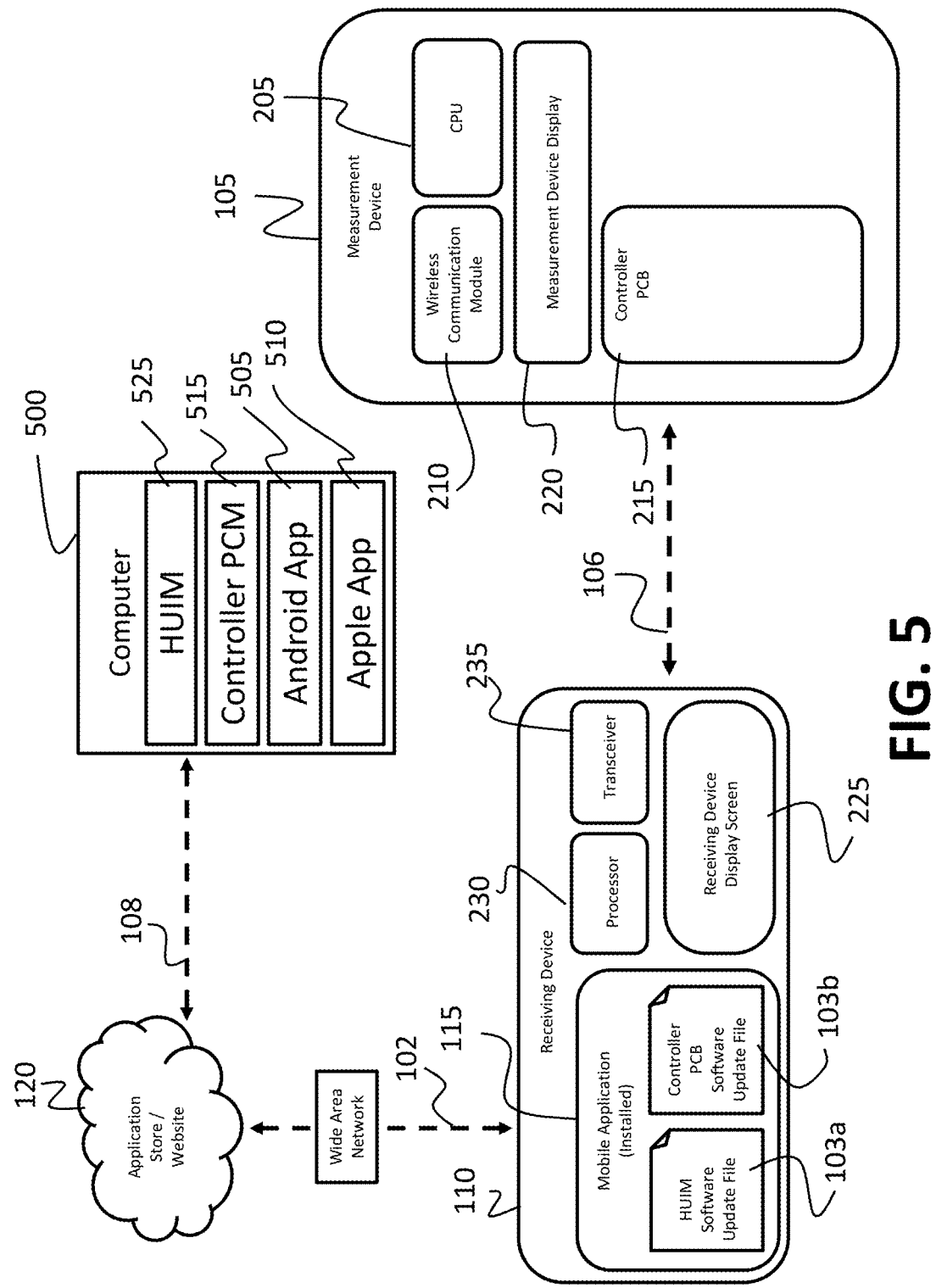
FIG. 5 illustrates a system hardware diagram of the central location which creates and pushes updates.

FIG. 5 illustrates the system hardware diagram of the central location, which creates and pushes software updates to the receiving device 110. In various embodiments, the central system may comprise a computer 500. The computer 500 may include a file system that is conceived, designed and produced in different programming languages. The file system may contain the HUIM firmware 525. The source code of the HUIM firmware 525 may be built, for example, in C++ within a QT development environment. The development path of the HUIM firmware 525 is, for example, compiled in a Linux Ubuntu operating system that resides in the computer 500. The file system may also include an exemplary PCM firmware 515. The PCM firmware 515 source codes are, for example, compiled in a Windows operating system located in the computer 500. In some embodiments, the PCM firmware 515 is composed of a firmware created in the appropriate environment such as Microchip MPLab. In some embodiments, the PCM firmware 515 is in charge of controlling all the functions of the measurement device 105, such as vacuum and pressure pumps, valves, pressure sensors, etc. The HUIM firmware 525 and the PCM firmware 515 may be remotely transferred to the measurement device 105 either through an application 115 installed on the receiving device 110 or through the USB port 820 (FIG. 8).

Additionally, in various exemplary embodiments, the file system may comprise an Android application 505 that is compiled in a Windows operating system on a computer 500. The Android application 505 is an exemplary embodiment of the app 115. The Android application 505 is transmitted from the computer 500 to the application store or website 120 and may be wirelessly downloaded to the receiving device 110.

The file system may also include an Apple iOS application 510 that follows the same architecture as the Android application 505, although it may be written in Objective-C. The Apple iOS application 510 is an exemplary embodiment of the installed mobile app 115. The Apple iOS application 510 is compiled on an iOS operating system residing on the computer 500. The Apple iOS application 510 is also transferred from the computer 500 to the application store or website 120 where it may be downloaded wirelessly by the user to the receiving device 110. Both the Android application 505 and the Apple iOS application 510 send and receive signals to the measuring device 105 following an embedded protocol. In some embodiments, the user takes control of the measuring device 105 through the wireless connection 106 (such as Wi-Fi or Bluetooth) in which the measuring device 105 acts as a server and the receiving device 110 acts as a client. In this mode all measuring device screens, commands, and readings are replicated in the receiving device 110 allowing the user to operate the measuring device 105 remotely.

Figure 6A:
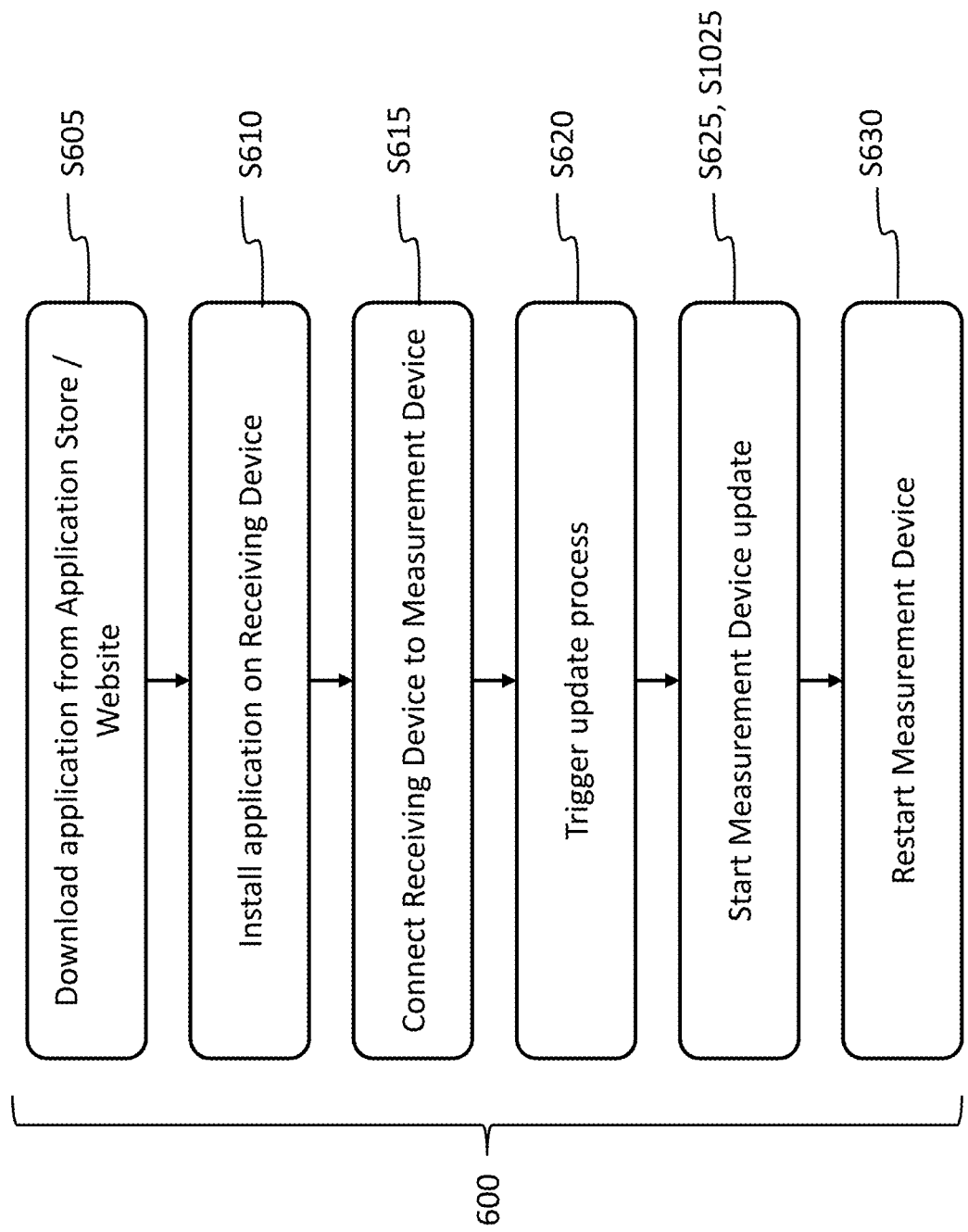
FIG. 6A is a flow diagram of a method of a measurement updating process from update at central location to reboot.

FIG. 6A illustrates the various components of an exemplary method of the present disclosure, exemplified by a process 600. At step S605, the receiving device 110 is operated to download or automatically update the application 115 from the application store or website 120. The receiving device 110 in some embodiments may be a tablet or a smartphone. At step S610, the user may install the application 115 on receiving device 110. In other embodiments, step S610 may proceed automatically following step S605. At step S615, wireless connectivity may allow the receiving device 110 to establish an isolated connection 106 with the measurement device 105 (see FIG. 4). This wireless connection may trigger the measurement device protocol to detect versions of the current HUIM firmware 105a and current controller PCB firmware 105b on the measurement device 110. At step S620, if one or both of the firmware 105a and the firmware 105b is older than the version supported by the application 115 (See FIG. 6C), the receiving device 110 through the application 115 may require the user to update to the version(s) supported by the application 115. At step S625, the update of the measurement device 105 in some embodiments starts with the HUIM firmware 525 and then proceeds to the controller PCB firmware 515. This process may take a few minutes. In other embodiments, at step S1025, the update of the measurement device 105 may be executed in a one-click update. That is, the update in accordance with step S1025 may be executed completely based on a single input (e.g., a tap, a click, a selection) from the user. In some embodiments, the one-click update may start with the controller PCB firmware 515 and then proceed to updating the HUIM firmware 525.

Once the update (whether by step S625, S1025, or another embodiment) is completed, the measurement device 105 may, for example, reboot (step S630) and the wireless connection 106 may have to be re-established between measurement device 105 and receiving device 110. At step S635 (see FIG. 6C), the receiving device 110 opens a remote terminal window (see FIG. 7H) and the data displayed on the receiving device 110 display 225 is now identical to the data displayed on the measurement device 105 display 220 (see FIG. 8).

Figure 6B:
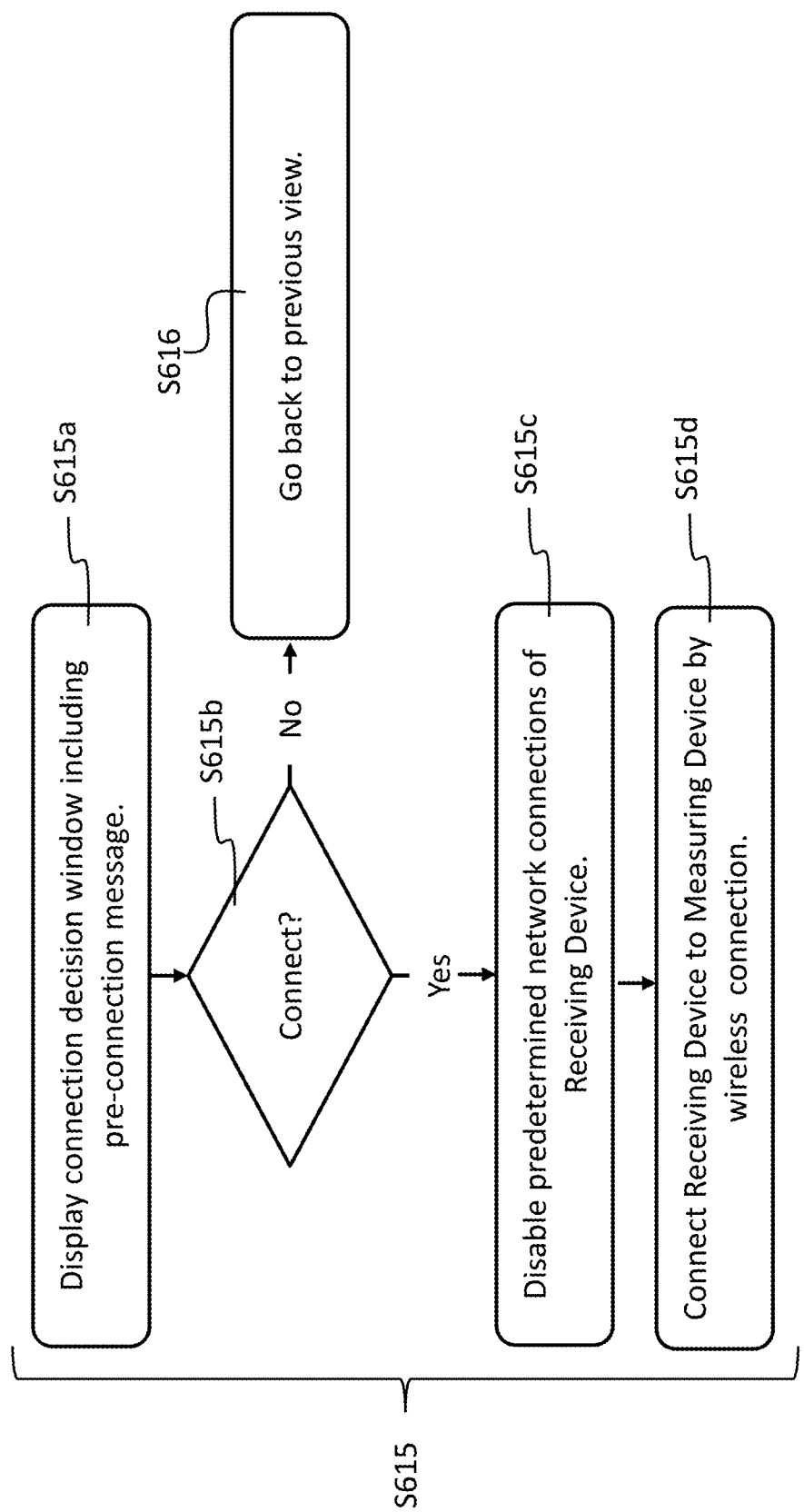
FIG. 6B is a sub-flow diagram of a method according to the embodiment of FIG. 6A.

FIG. 6B illustrates sub-steps of the step S615 for connecting the receiving device 110 to the measurement device 105. A corresponding view is shown in FIG. 7A4. At S615a, a pre-connection message is displayed to warn the user that connecting to the measurement device 105 will terminate connections to predetermined networks (e.g., WAN/Internet, LAN, etc.) In response to this warning, at step S615b, a decision is received as to whether to continue connecting to the measurement device 105 or to go back to the previous view via step S616. When the result of S615b is a decision to continue, control proceeds to step S615c, wherein the predetermined networks (e.g., WAN/Internet, LAN, etc.) are disabled. Next, at S615d, the receiving device 110 is connected to the measuring device 105 by the wireless connection 106.

Figure 6C:
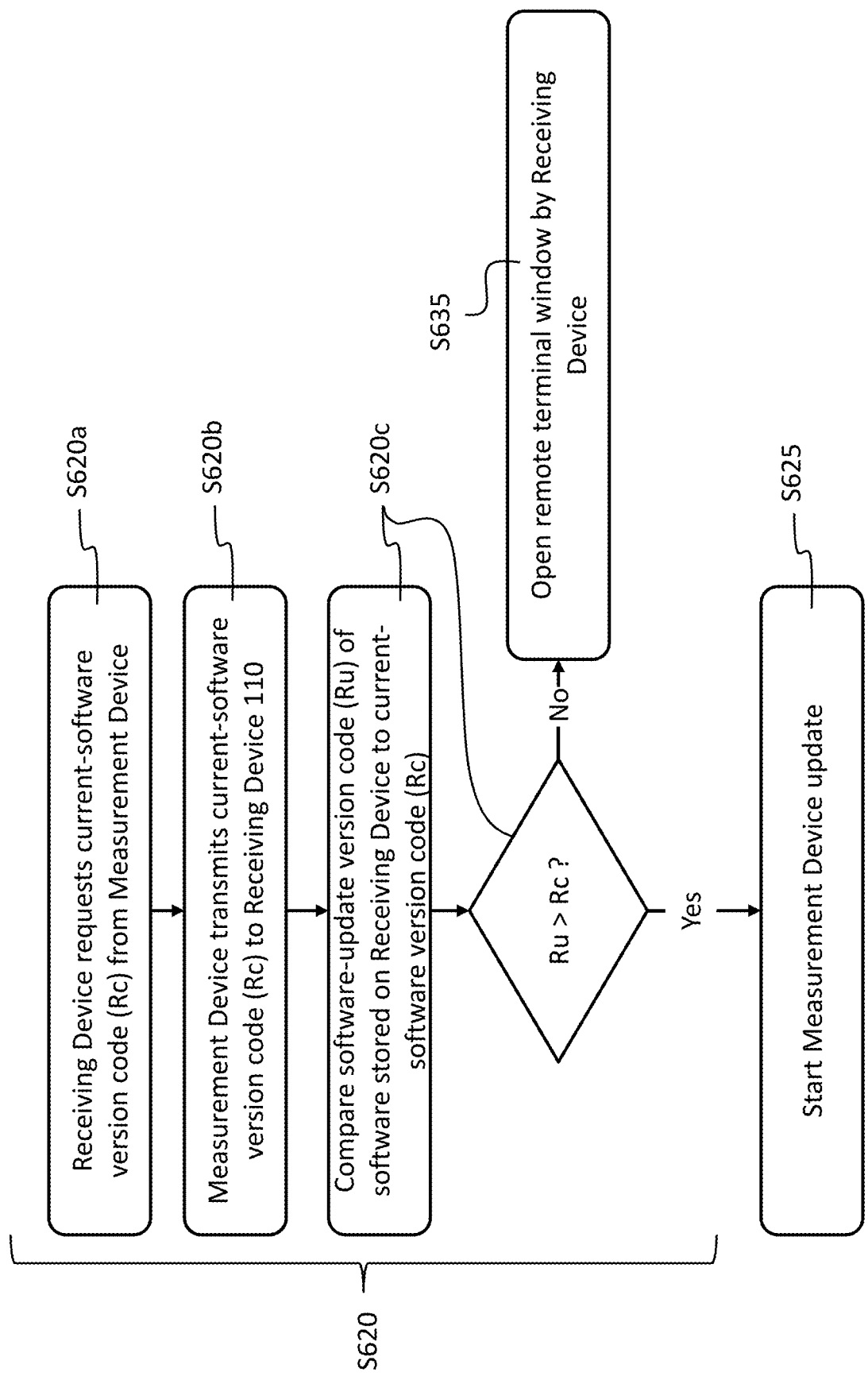
FIG. 6C is another sub-flow diagram of a method according to the embodiment of FIG. 6A.

FIG. 6C illustrates sub-steps of step S620 wherein an update process is triggered. At step S620a, the receiving device 110 requests a current-software version code (Rc) from the measurement device 105. In some embodiments, the current-software version code (Rc) is a line of code. In response, at step S620b, the measurement device 105 transmits its current-software version code (Rc) to the receiving device 110. Next, at step S620c, a software-update version code (Ru) of software stored on the receiving device 110 is compared to the current-software version code (Rc). In some embodiments, the software-update version code (Ru) is a line of code.

When the software-update version code (Ru) is greater than the current-software version code (Rc), this indicates that the measurement device 105 has outdated software as compared to that available via the receiving device 110. In this case, the process proceeds to step S625, wherein the measurement device update is started.

Alternatively, when the software-update version code (Ru) is less than or equal to the current-software version code (Rc), this indicates that the measurement device 105 has software that is not outdated compared to that available via the receiving device 110. No software update for the measurement device 105 is required at this time. The process proceeds to step S635, wherein a remote terminal window is opened by the receiving device 110 to mirror the data, information, and controls shown on the measurement device 105.

In various embodiments, the step S620 (and e.g., substeps) is performed for each instance of stored software, including each updatable firmware, employed in the measurement device. For example, in the exemplary measurement device 105, the step S620 is performed with respect to the HUIM firmware 105a and with respect to the controller PCB firmware 105b. In other embodiments, additional software components may be checked by the same process S620 and its sub-processes, to ascertain whether those components are in need of updating.

Figure 6D:
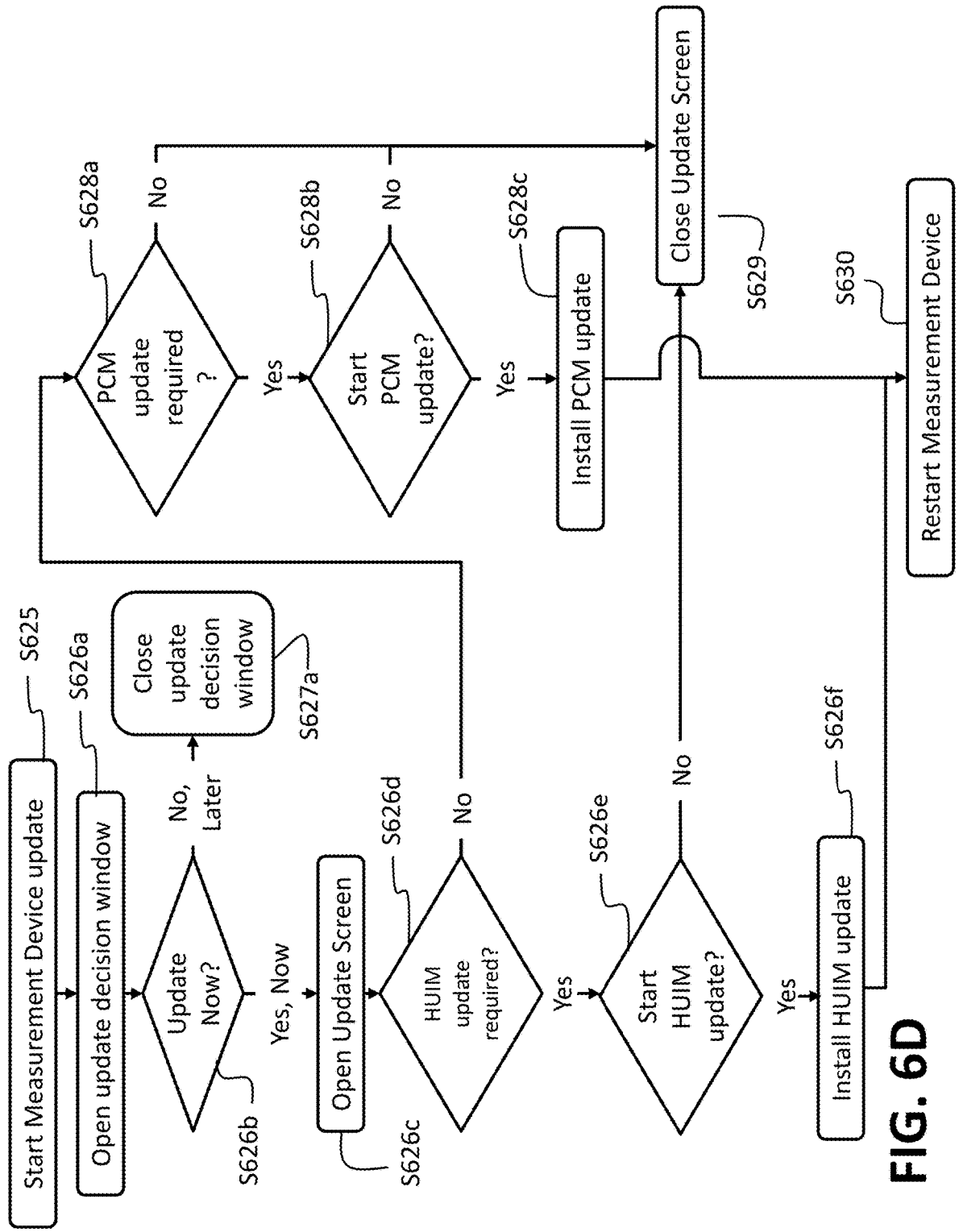
FIG. 6D is yet another sub-flow diagram of a method according to the embodiment of FIG. 6A.

Referring now to FIG. 6D, in an embodiment, the process of updating the measurement device 105 flows from step S625, wherein the updating of the measurement device 105 starts. At step S626a, an update decision window is opened (See FIGS. 7B1, 7B2, 7B3). At step S626b, a decision as to whether to update now is received.

In general, the result of step S626d may be derived from the process performed at step S620, which was performed previously. Namely, the software-update version code (RuHUIM) for the HUIM software 103a was compared to the current-software version code (RcHUIM) for the HUIM firmware 105a to determine whether the HUIM firmware 105a required an update.

At step S626e, a decision is received as to whether to start the HUIM update. If the decision is negative, the process proceeds to step S629 and the update screen is closed. Alternatively, if the result is positive, the process proceeds to step S626f and the HUIM update is installed (See FIGS. 7D, 7E), after which the measurement device powers-off and reboots at S630.

Returning to step S628a, it is determined whether a PCM update is required. In general, as discussed above, the result of step S628a may be derived from the process performed at step S620, which was performed previously. Namely, the software-update version code (RuPCB) for the PCB software 103b was compared to the current-software version code (RcPCB) for the PCB firmware 105b to determine whether the PCB firmware 105b required an update.

If the result at step 628a is negative, the process proceeds to step S629 and the update screen is closed. Alternatively, if the result at step S628a is positive, the process proceeds to step S628b, wherein a decision is received as to whether to start the PCM update.

If the decision at step S628b is negative, the process proceeds to step S629 and the update screen is closed. Alternatively, if the decision at step S628a is positive, the process proceeds to step S628c and the PCM update is installed (See FIGS. 7F, 7G), after which the measurement device 105 powers-off and reboots at S630.

FIGS. 7A to 7H show an exemplary graphical user interface (GUI) 700 of the mobile application (app) 115 running on the receiving device 110. The example is discussed with reference to a touch-screen tablet device. However, other devices including laptop computers, smartphones, wearable devices, or other devices may be employed in accordance with other embodiments. In various embodiments, devices running any of various operating systems may be employed, including, but not limited to, Android, Apple iOS, or Windows. Some embodiments employ a measurement device manufactured by Barfield Inc., while other embodiments employ measurement devices manufactured by others.

Referring now to FIG. 7A1, a connect screen view of the GUI 700 is shown. The exemplary connect screen view enables a user of the receiving device 110 to establish Wi-Fi connectivity with the measurement device 105, to automatically trigger the firmware update process in accordance with step S620, and to launch a remote terminal window in accordance with step S635. In some embodiments, the connect screen view may be the first view presented to a user upon launching the app 115 of the receiving device 110. In other embodiments, one or more other views may precede the connect screen view 700a upon launching the app 115.

Referring now to FIGS. 7A2 and 7A3, in some embodiments, the app 115 automatically detects if there is a Wi-Fi connection available and presents a connect window 715 to prompt the user to address one or more possible scenarios. For example, if there is no Wi-Fi connection, the connect window 715 opens and displays an undetected Wi-Fi connection message 717a (FIG. 7A2) "Wi-Fi is disconnected. Proceed to open Settings and connect to Wi-Fi device (DPS1000|181100)" and an open settings soft key 718. When the user taps the open settings soft key 718, the app 115 opens an appropriate view, for example an operating system view, to permit Wi-Fi settings to be verified.

Referring to the example of FIG. 7A3, if the app 115 is not connected to an appropriate measurement device Wi-Fi, the connect window 715 opens and displays an undetected measurement device Wi-Fi message 717b (FIG. 7A3) "There is no DPS|1811 specific connection available, please check your settings" and the open settings soft key 718. When the user taps the open settings soft key 718, the app 115 opens an appropriate view, for example an operating system view, to permit Wi-Fi settings to be verified.

Referring again to FIG. 7A1, a connection selector pane 705 permits a user to choose a connection from a list of connections 706. In some embodiments, the connections listed are service set identifiers (SSIDs) of nearby wireless networks. In other embodiments, the connections listed are stored names of devices previously connected. In still other embodiments, the connections listed include a combination of such identifiers, or are based on a centrally-propagated list. The connections listed in the connection selector pane 705 may be updated from time to time (for example when the receiving device 110 is moved between work sites or as various measurement devices 105 come and go from a single site) by the user tapping a refresh soft key 710. In other embodiments, the connection selector pane 705 may be updated by the app 115 at intervals of, for example, 1 minute, 5 minutes, or 10 minutes.

After a connection is selected, from the list of connections 706, the user may then tap the connect soft key 708 to begin the process of connecting the measurement device 105 to the receiving device 110.

In accordance with various embodiments, before the receiving device 110 connects to the measurement device 105, the receiving device 110 disconnects one or more of its connections to other networks. For example, referring again to FIG. 4, in some embodiments, the receiving device may have the wide area network (WAN) connection 102 to connect to the Internet, the local area network (LAN) connection 104 to connect to a private intranet, and the wireless connection 106 to connect to the measurement device 105. However, to isolate the measurement device 105, the app 115 may enforce a policy under which the wireless connection 106 will not be made until or after one or both of the WAN connection 102 and the LAN connection 104 are terminated.

Referring again to FIG. 4, in an embodiment, the receiving device 110 includes the WAN adapter 402 to form the WAN connection 102, the LAN adapter 404 to form the LAN connection 104, and the transceiver 235 to form the wireless connection 106. Each of these adapters 102, 104, 106 permits wireless communication (e.g., radio, satellite, infrared, or other communication methods). Thus, in one embodiment, the WAN adapter 402 is a cellular network adapter, the LAN adapter 102 is a Wi-Fi network adapter, and the transceiver 235 is a Bluetooth adapter. In another embodiment, the receiving device 110 includes multiple Wi-Fi network adapters, one to form each of the WAN connection 102, the LAN connection 104, and the wireless connection 106.

Referring to FIG. 7A4, in an embodiment, after a user taps the connect soft key 708, the app 115 presents a connection decision window 721 to notify the user that connecting the receiving unit 110 to the measurement unit 105 will terminate one or more network connections, with an appropriate pre-connection message 717c. At this point, the user has the option to go back to the previous view by way of the go back soft key 719b. However, if the user is willing to disconnect from the one or more networks indicated, the user can press a continue soft key 719a to proceed with disconnecting network connections (e.g., 102, 104) and forming the wireless connection 106 between the receiving device 110 and the measurement device 105.

Referring to FIG. 7A5, in some embodiments, the GUI 700 includes a battery state of charge indicator 702 and a connected device signal strength indicator 704. These GUI elements, among others, may be present in all or some of the GUI views while other elements may appear or disappear between the various views. For example, the connect screen view shown in FIG. 7A5 includes a system bar 701 including the battery state of charge indicator 702 and an app title bar 703 including the connected device signal strength indicator 704. In some embodiments, the system bar 701 and the app title bar 703 remain visible in all views of the GUI 700.

The exemplary connect screen view in FIG. 7A5 shows that the receiving device 110 is connected with a strength of 4 out of 5 to a Wi-Fi connection designated as "1811NG_00002", as shown both in the app title bar 703 and in the list of connections 706. In some embodiments, this connectivity is isolated and occurs only between the tablet (exemplary receiving device 110) and the DPS1000/1811NG (exemplary measuring device 105). In some embodiments, only one tablet (exemplary receiving device 110) can be wirelessly connected to one DPS1000/1811NG (exemplary measurement device 105) at a time. In some embodiments, the measurement device 105 is configured to allow only one wireless device connection at a time (e.g., Bluetooth, Wi-Fi, or another wireless connection).

Referring again to FIG. 7A1, in one example, a test set connection pane 712 permits the user to connect the app 115 on the receiving device 110 to a remote terminal on the measuring device 105 by tapping a connect soft key 716. In some embodiments, after the connect soft key 716 has been tapped, if the app 115 detects an older version of the firmware than the one it supports, a pop-up software update decision window 720 appears as shown in FIGS. 7B1, 7B2, and 7B3.

Referring now to FIGS. 7B1, 7B2, and 7B3, the exemplary software update decision window 720 includes a message 722a, 722b, or 722c; an update soft key 724; and a later soft key 726. When both the HUIM firmware and the PCM firmware require updates, the app 115 displays the message 722a "DPS1000/1811NG software requires update." as shown in FIG. 7B1. Sometimes, the measurement device requires an update from both HUIM and PCM. However, in some instances only one update process is required. In such cases, the software not requiring an update remains disabled and a pop-up screen opens with the appropriate software update message, per 7B1, 7B2, and 7B3.

Figure 7C:
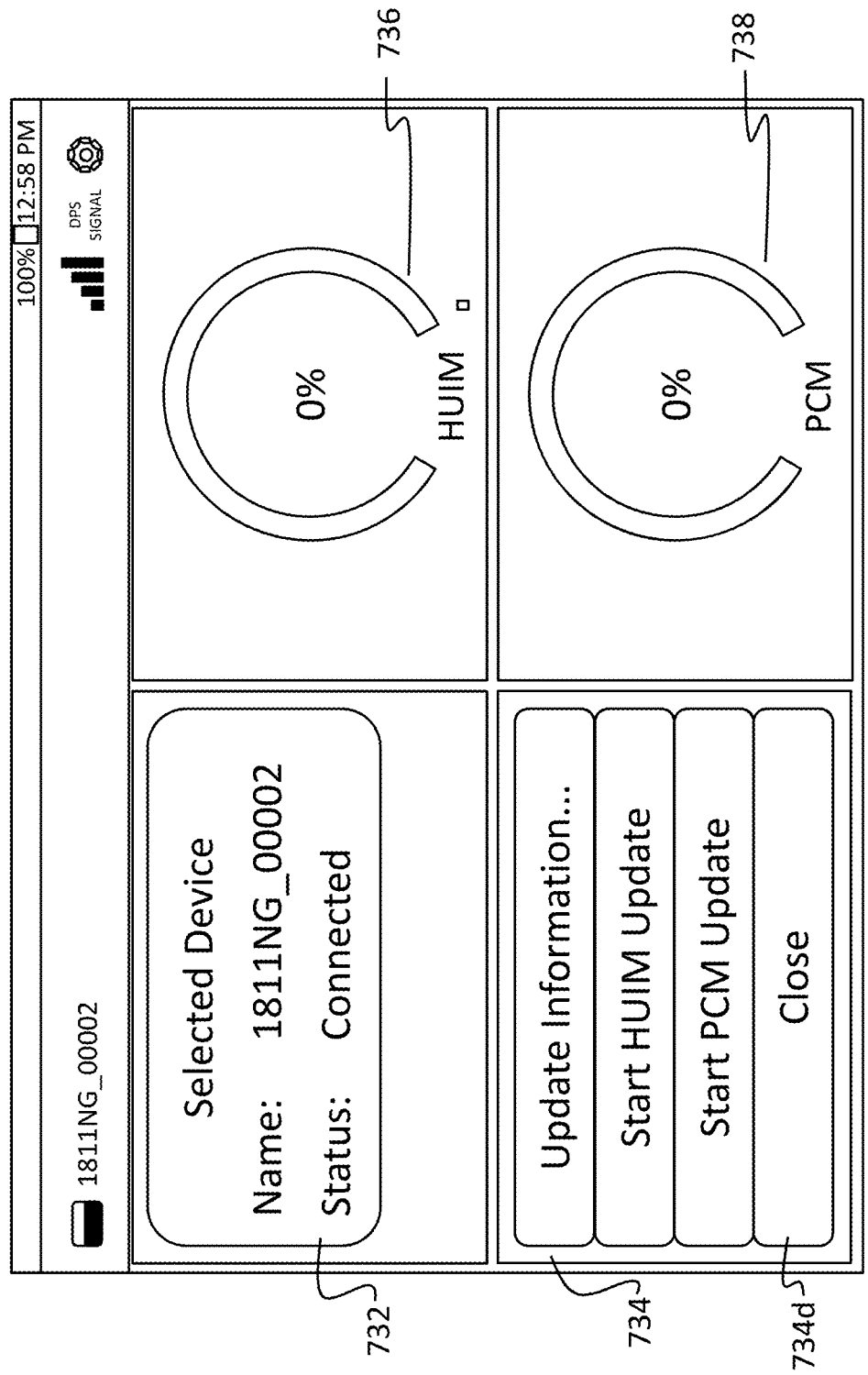
FIG. 7C is a view of a GUI according to an embodiment.

When only the HUIM requires an update, the app 115 displays the message 722b "HUIM software requires update." as shown in FIG. 7B2. When only the PCM requires an update, the app 115 displays the message 722c "PCM software requires update." as shown in FIG. 7B3. If the user taps the update soft key 724, the app 115 proceeds to display a software update screen as shown in FIG. 7C. However, if the user taps the later soft key 726, as shown in FIGS. 7B1, 7B2, and 7B3, the app 115 proceeds to display a remote terminal screen as shown in FIG. 7H.

FIGS. 7C, 7D, 7E1, 7F, and 7G show an exemplary update screen having an information panel 732, an action update panel 734, an HUIM update progress panel 736, and a PCM update progress panel 738. The information panel 732 displays relevant information and is updated from time to time using for example, the process shown in FIG. 6D.

FIG. 7C, shows a software update screen, corresponding to step S626c, when neither the HUIM update nor the PCM update has commenced. In an embodiment, a close-finish soft key 734d may be pressed in order to close the software update screen at any time.

Figure 7D:
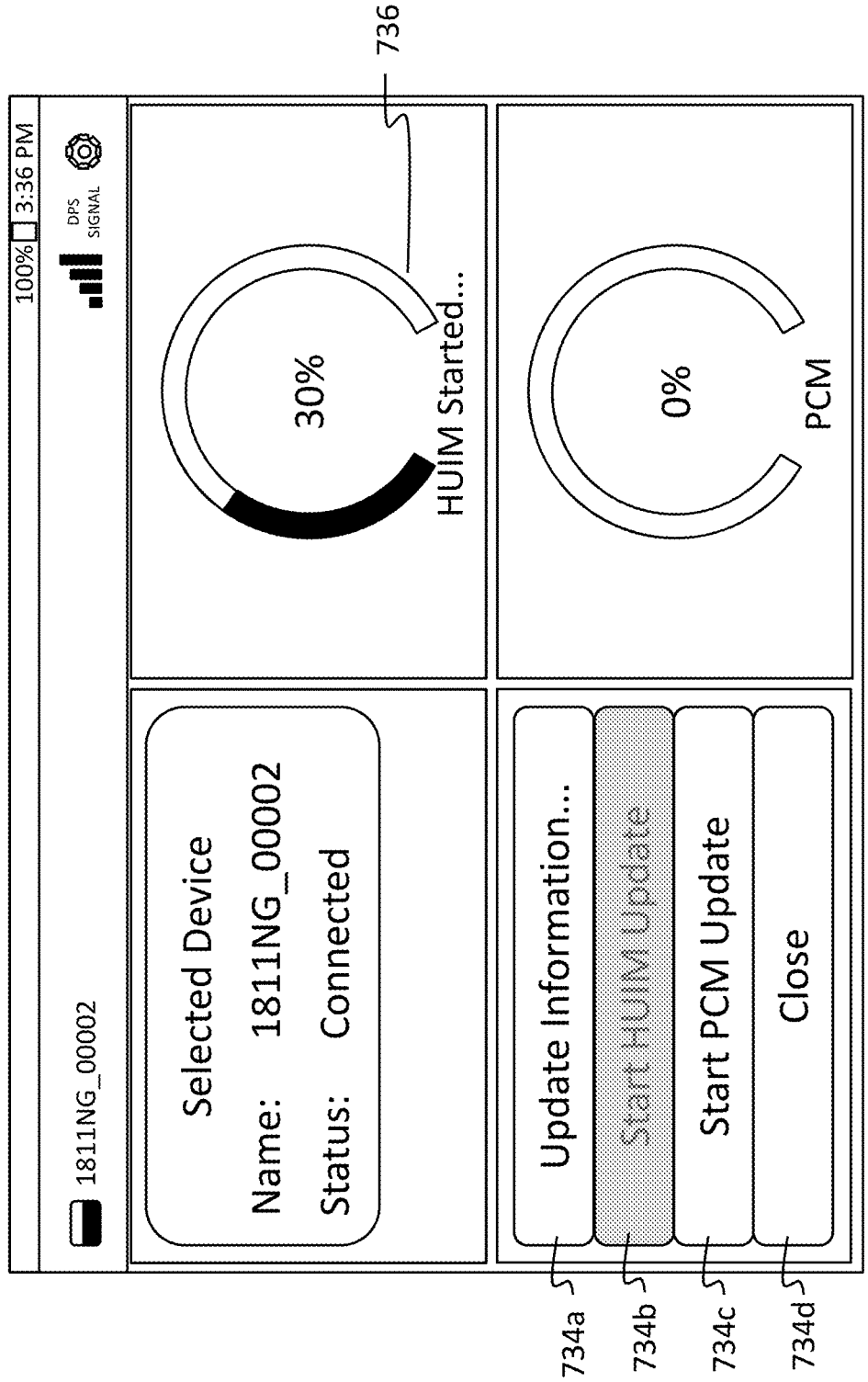
FIG. 7D is a view of a GUI according to an embodiment.

FIG. 7D shows the HUIM update in progress, corresponding to step S626f (See FIG. 6D). In some embodiments, an update information field 734a may change from time to time to show a verbal description of the status of the update(s). In some embodiments, the HUIM update is initiated by pressing a start HUIM update soft key 734b. Likewise, in some embodiments, the PCM update is initiated by pressing a start PCM update key 734c. In some embodiments, the start HUIM update soft key 734b and/or the start PCM update soft key 734c may be displayed with a different shading, color, or style after it has been pressed. In other embodiments, the soft keys 734b, 734c may be displayed with a different shading, color, or style depending on the result of the corresponding determination at steps S626d and S628a, respectively. That is, if no HUIM update is required, the soft key 734b may be greyed-out and rendered inoperable to the user in various embodiments. Likewise, if no PCM update is required, the soft key 734c may be greyed-out and rendered inoperable to the user in various embodiments.

FIG. 7E1 shows the HUIM update finished and the Wi-Fi connection 106 disconnected, corresponding to step S628a, in the case where both the HUIM and the PCM initially required updating. In some embodiments, the receiving device 110 automatically reconnects to the measurement device 105 after a re-boot at step S630 (FIG. 6D). In other embodiments, it may be necessary to manually re-connect to the measurement device 105 after a re-boot of the measurement device 105. In this case, some embodiments include a connect soft key 740 whereby the wireless connection 106 may be re-connected.

Referring now to FIG. 7E2, some embodiments may further require Wi-Fi to be connected by the connect window 715, which opens and displays the Wi-Fi connection message 717a (FIG. 7A2) "Wi-Fi is disconnected. Proceed to open Settings and connect to Wi-Fi device (DPS1000|181100)" and the open settings soft key 718. When the user taps the open settings soft key 718, the app 115 opens an appropriate view, for example an operating system view, to permit Wi-Fi settings to be verified.

Figure 7F:
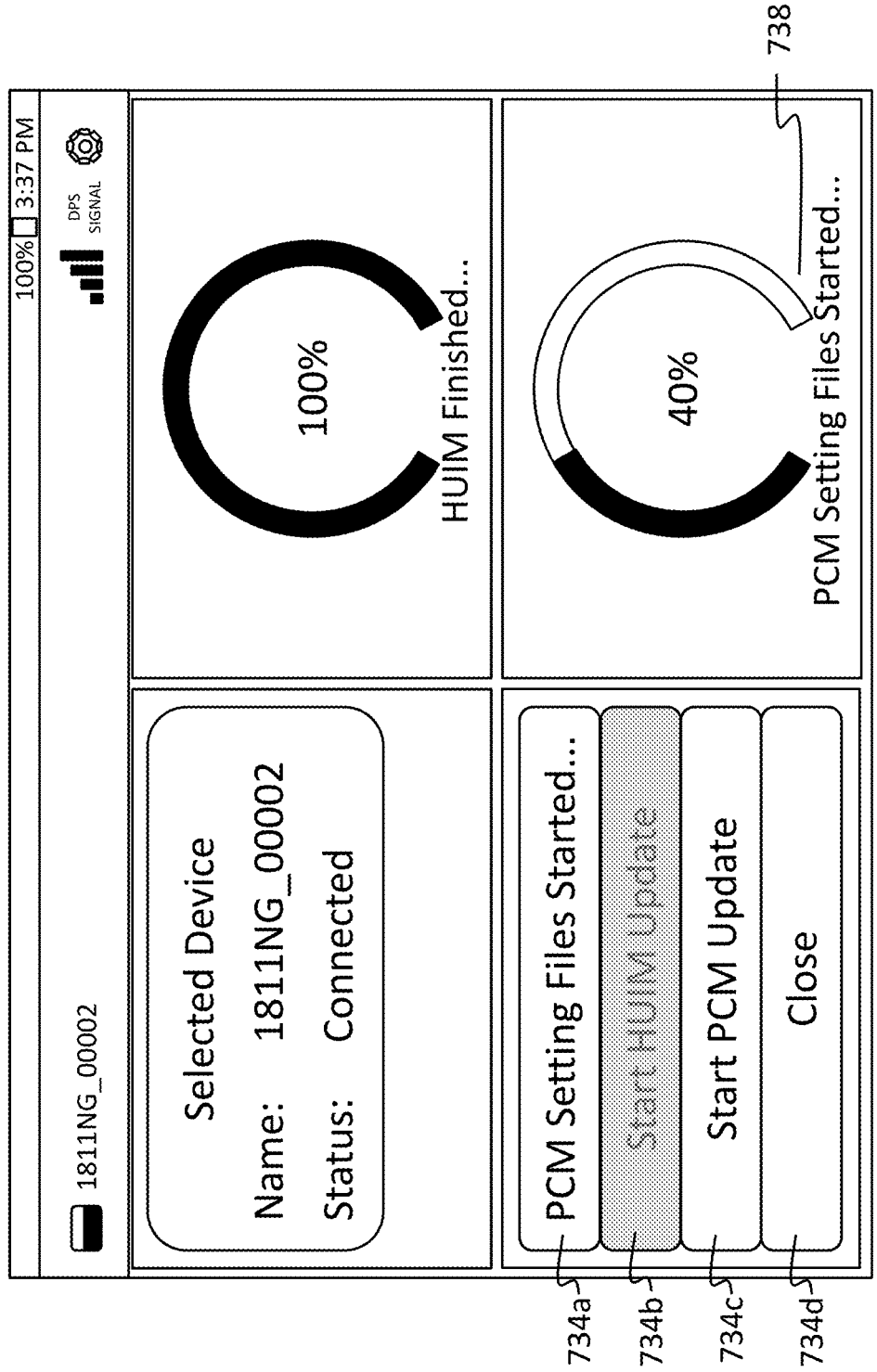
FIG. 7F is a view of a GUI according to an embodiment.

FIG. 7F shows the PCM update in process, corresponding to step S628c (See FIG. 6D.)

In some embodiments, in operating the receiving device 110 to update firmware in the measurement device 105, the user is instructed to ensure the measurement device 105 is not connected to any aircraft and is not in control mode or running any process that requires control mode. Before beginning an update, the user is also advised to ensure a battery level of above 20% to prevent the receiving device 110 from powering-off and stopping the update process, which has the potential to damage the measurement device 105. During the update process, the user is advised to remain within a recommended signal range of from 2 to 5 out of 5, as shown in the connected device signal strength indicator 704. To accomplish this, the user may be advised to avoid moving the receiving device 110 far away from the measuring device 105 and/or obstructing the connection path between the devices. Before starting the update process, the measurement device 105 should be completely initialized. The user should ensure the unit's name in the update window is identical to the one in the app title bar 702. During the update process, the user should not stop the app 115.

Figure 7G:
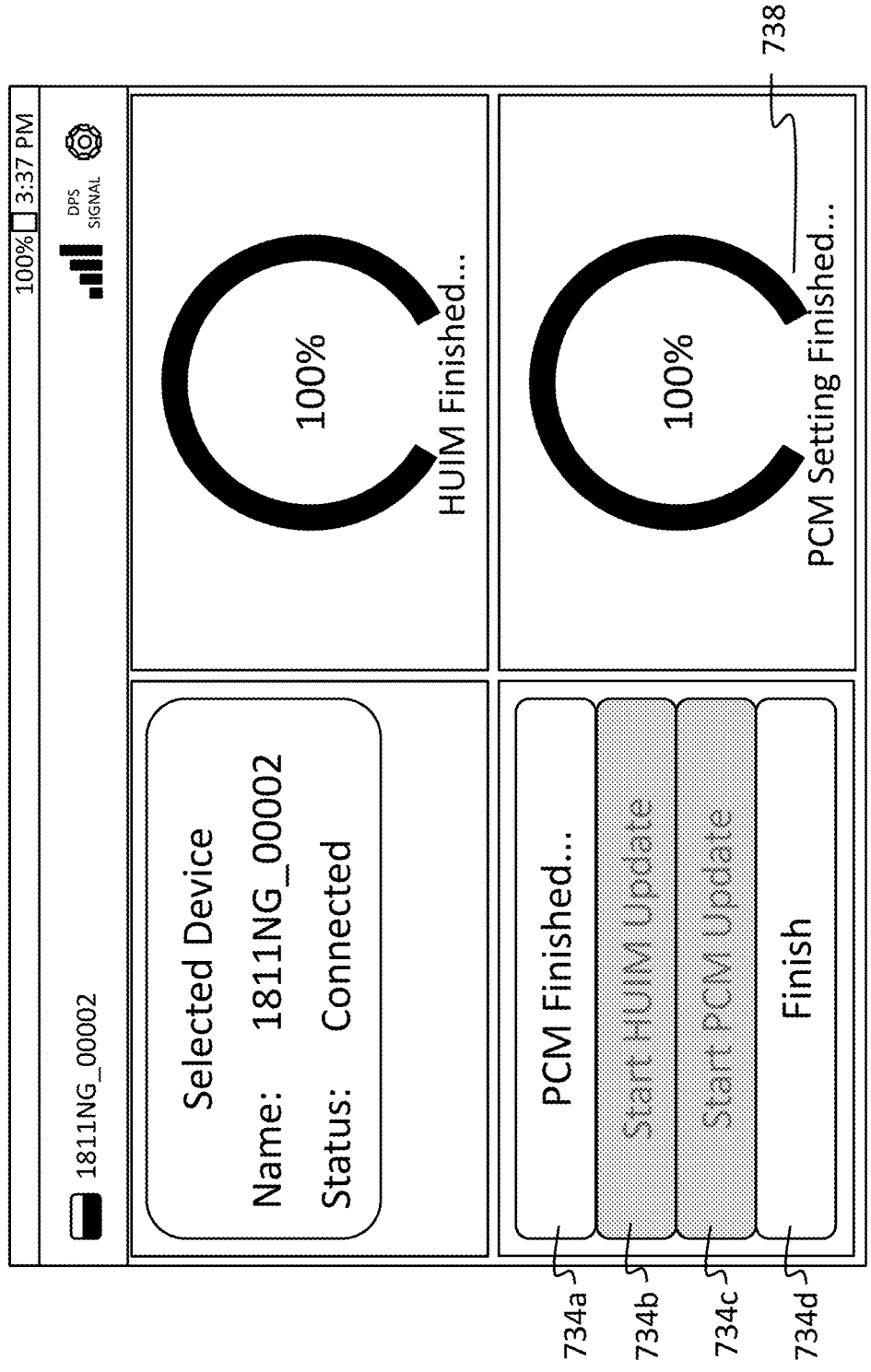
FIG. 7G is a view of a GUI according to an embodiment.
Figure 7H:
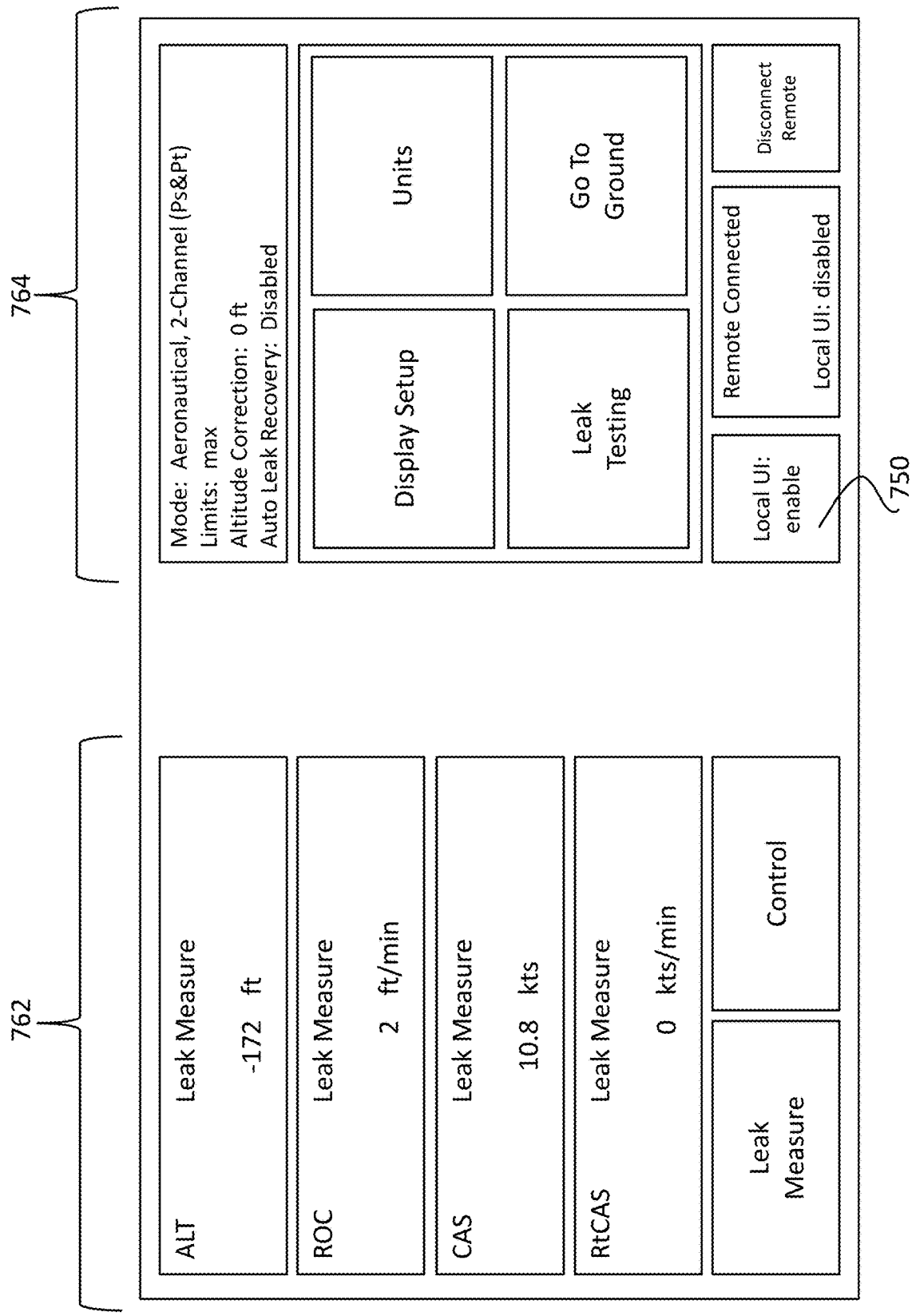
FIG. 7H is a view of a GUI according to an embodiment.

FIG. 7G shows the PCM update finished and the Wi-Fi connection 106 connected. In an embodiment, once all updates are complete the close-finish soft key 734d changes from showing the text "Close" to showing the text "Finish." With all updates completed, the measurement device 105 is now ready to connect with the receiving device 110 such that the remote terminal appearing on the receiving device display screen 225 is identical to the interface appearing on the measurement device display screen 220.

In some embodiments, after connecting with the measurement device 105 the receiving device 110 (e.g., tablet, wearable, smart glasses, etc.) becomes the Master Unit Interface (MUI) with an active touch screen (or virtual touch screen), and the touch screen on the measurement device 105 is disabled. In an embodiment, when the receiving device 110 is the MUI, the GUI 842 on the touch screen display 840 of the measurement device 800 may indicate "Remote: Connected", "Local UI: disabled". To regain touch control on the measurement device 105, the user may select a local UI enable soft key 750 on the GUI 842 of the measurement device 105. In some embodiments, as shown for example in FIG. 7H, a left half 762 of the GUI 700 provides all measurement and control display screens and a right half 764 of the GUI 700 provides all menu displays and selections.

Figure 10:
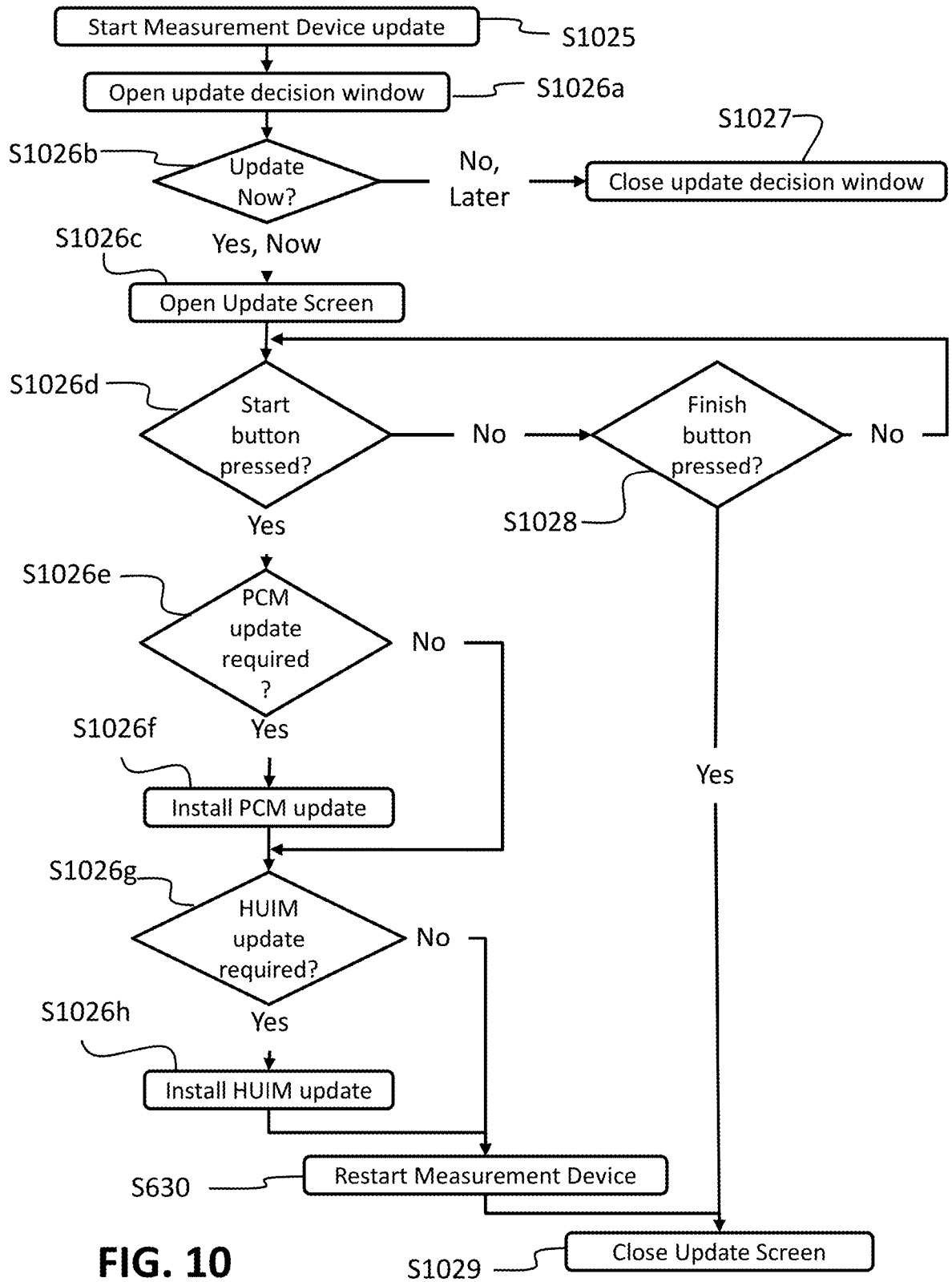
FIG. 10 is still another sub-flow diagram of a method according to the embodiment of FIG. 6A.
Figure 11A:
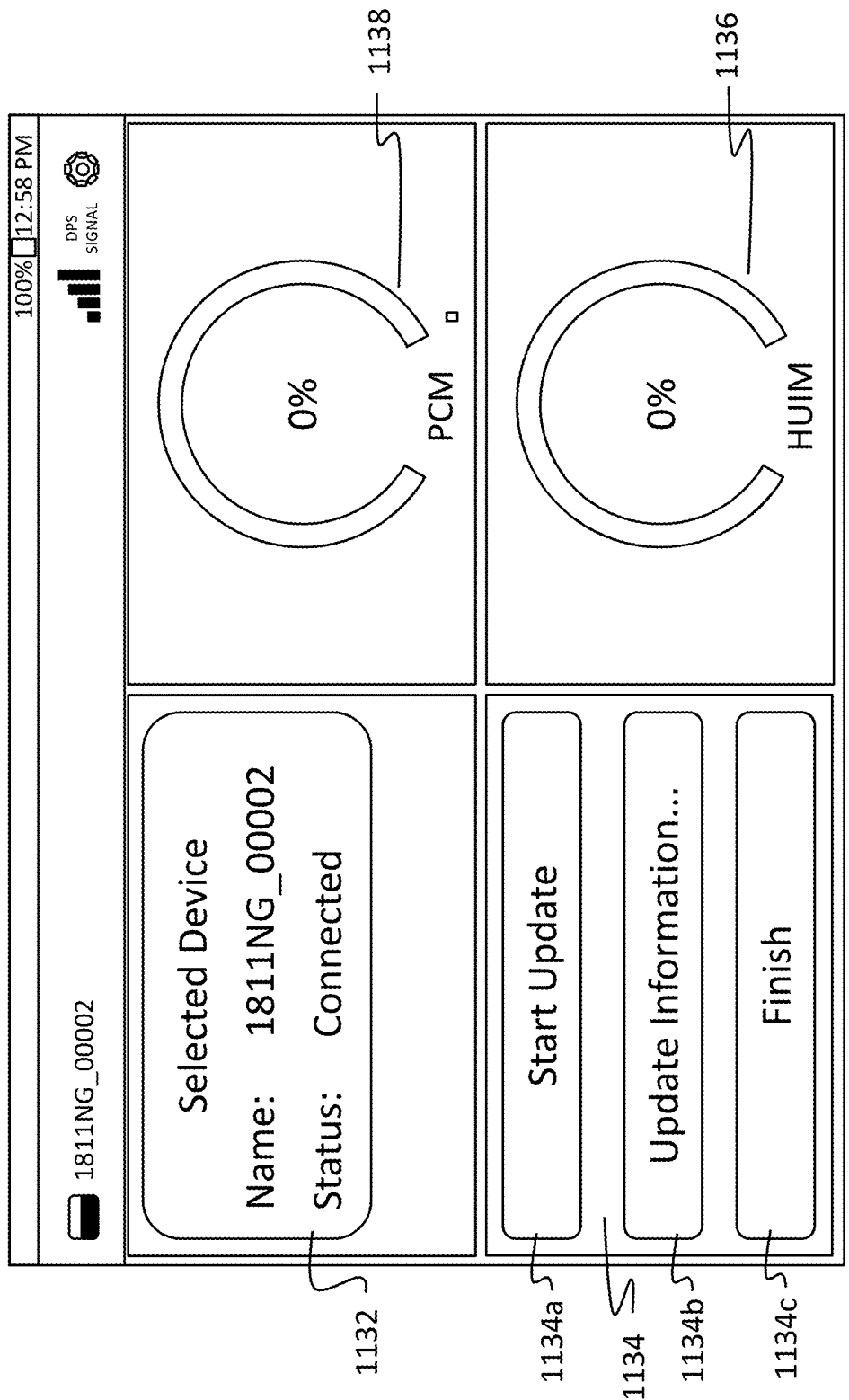
FIG. 11A is a view of a GUI according to an embodiment.

Referring now to FIG. 10, in an embodiment, the process of updating the measurement device 105 flows from step S1025, wherein the updating of the measurement device 105 starts. At step S1026a, an update decision window is opened (See FIGS. 7B1, 7B2, 7B3). At step S1026b, a decision as to whether to update now is received. When the result is a decision to update later, the process proceeds to step S1027, wherein the update decision window is closed. Alternatively, when the result at step S1026b is a decision to update now, the process proceeds to step S1026c, wherein an update screen is opened (see FIG. 11A).

The process then proceeds to step S1026d, wherein it is determined whether a start button 1134a (see FIG. 11A) has been pressed (e.g., by the user striking a physical key, clicking with a mouse cursor, pressing a soft key such as the button 1134a on a touchscreen, expressing a verbal cue, performing a gesture, or the like). If the result at step S1026d is positive, the process proceeds to step S1026e. Alternatively, if the result at step S1026d is negative, the process proceeds to step S1028.

At step S1028, it is determined whether a finish button 1134c (see FIG. 11A) has been pressed (e.g., by the user striking a physical key, clicking with a mouse cursor, pressing a soft key such as the button 1134b on a touchscreen, expressing a verbal cue, performing a gesture, or the like). If the result at step S1028 is positive, the process proceeds to S1029, wherein the update screen is closed. Alternatively, if the result at step S1028 is negative, the process returns to step S1026d.

At step S1026e, it is determined whether a PCM update is required. In general, as discussed above, the result of step S1026e may be derived from the process performed at step S620, which was performed previously. Namely, the software-update version code (Ru) for both the HUIM software 103a and the PCM software 103b were compared to the current-software version code (Rc) for both the HUIM firmware 105a and the PCM firmware 105b to determine whether either or both the firmwares 105a and 105b required an update.

Figure 11B:
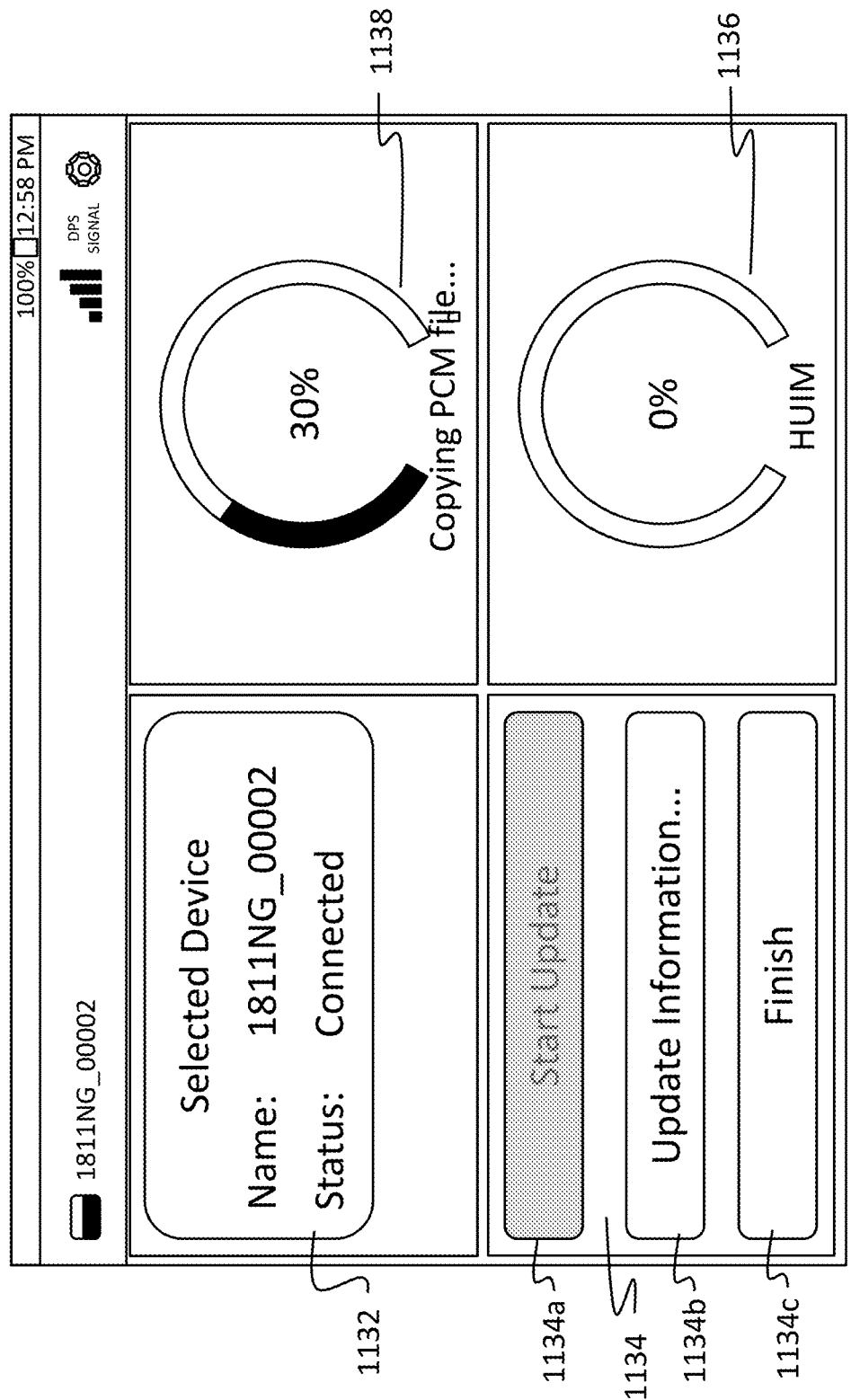
FIG. 11B is a view of a GUI according to an embodiment.

If the result at step S1026e is negative, no PCM update is needed and the process proceeds to step S1026g to determine whether the HUIM needs updating. Alternatively, if the result at step S1026e is positive, the PCM update is installed at step S1026, as shown in FIG. 11B. In some embodiments, the updating the PCM includes copying a PCM file from the application 115 to the PCM firmware 105b, as shown in FIG. 11B. Upon completion of the PCM update, the process proceeds to step S1026g to likewise update the HUIM, if needed.

If the result at step S1026g is negative, the process proceeds to step S630, wherein the measurement device 105 is restarted. Alternatively, if the result at step S1026g is positive, the process proceeds to step S1026h.

Figure 11D:
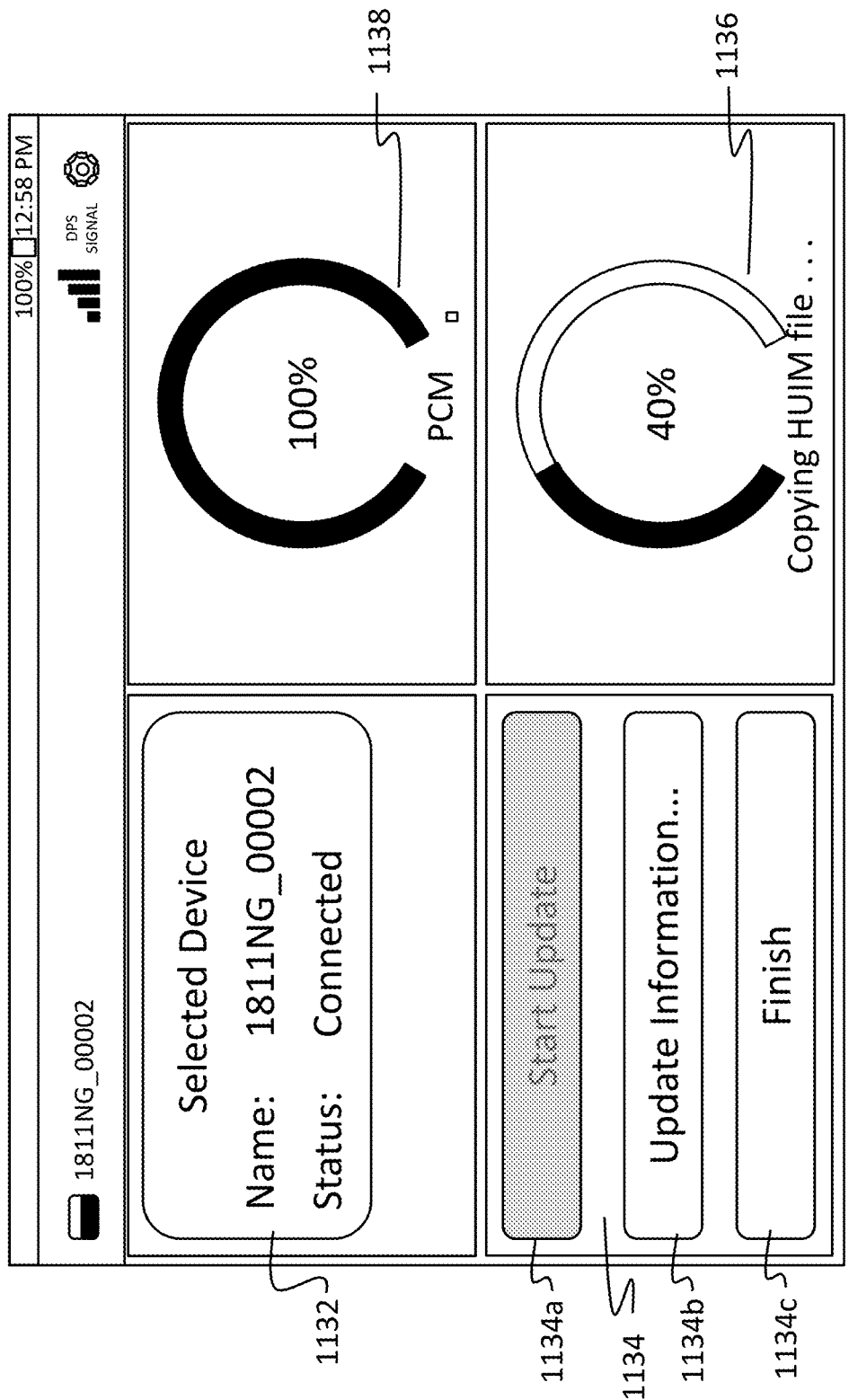
FIG. 11D is a view of a GUI according to an embodiment.
Figure 11E:
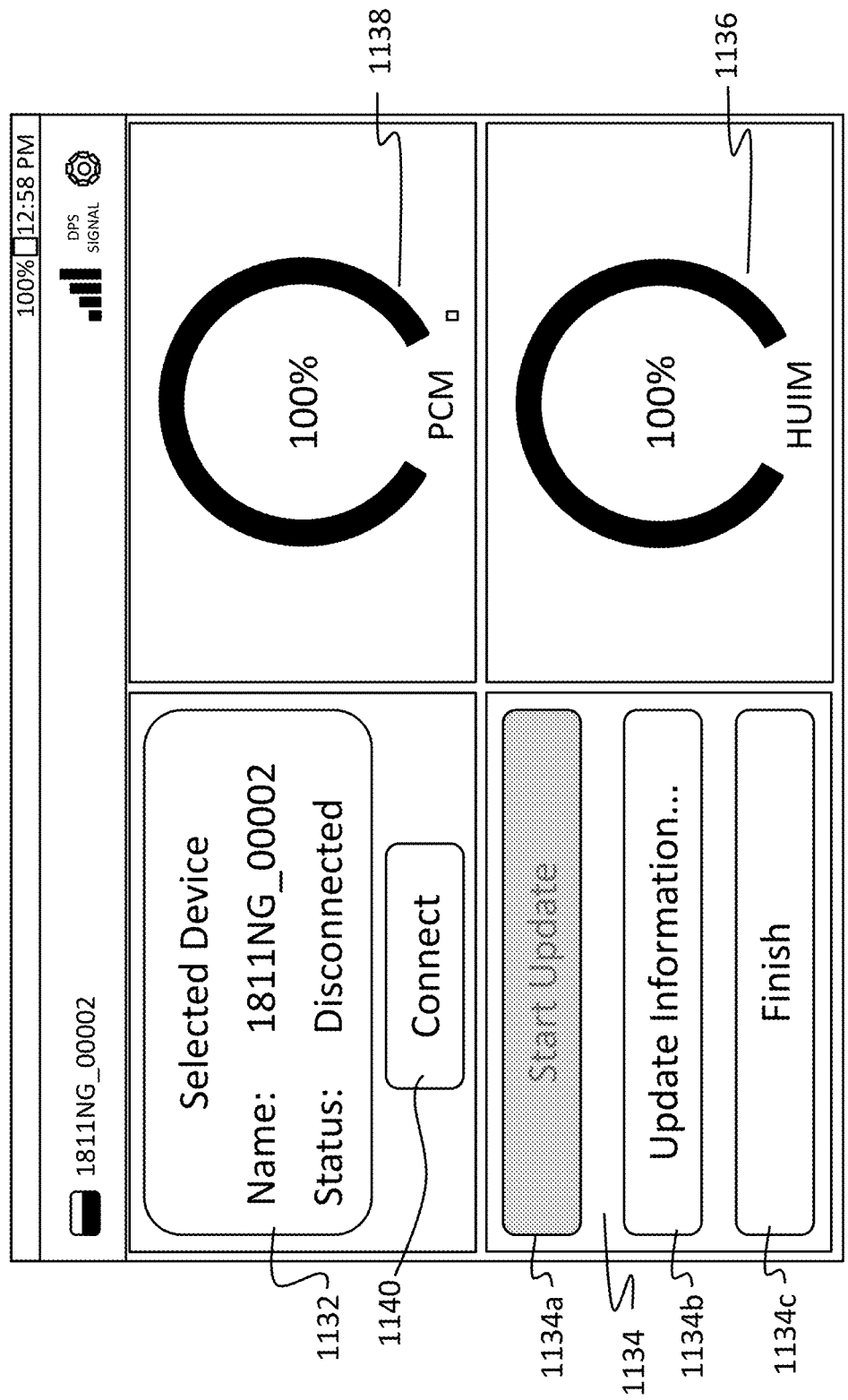
FIG. 11E is a view of a GUI according to an embodiment.

At step S1026h, the HUIM update is installed, as shown in FIG. 11D. In some embodiments, the updating the HUIM includes copying an HUIM file from the application 115 to the HUIM firmware 105a, as shown in FIG. 11D. Upon completion of the HUIM update, as shown in FIG. 11E, the process proceeds to step S630, wherein the measurement device 105 powers-off and reboots at S630.

FIGS. 11A, 11B, 11C1, 11C2, 11D and 11E show an exemplary update screen having an information panel 1132, an action update panel 1134, an HUIM update progress panel 1136, and a PCM update progress panel 1138. The information panel 1132 displays relevant information and is updated from time to time using for example, the process shown in FIG. 10.

In some embodiments, it may be necessary to manually reestablish the wireless connection 106 following a reboot, as shown in FIGS. 11C1, 11C2, and 11E. In other embodiments, the wireless connection 106 may be reestablished automatically following a reboot.

Embodiments may include a method for automatically and remotely updating software on a measurement device which is isolated from wide area networks, comprising the steps of: downloading an upgrade application on to a receiving device from a wide area network; installing the downloaded application on the receiving device; establishing a wireless connection between the receiving device and a measurement device, wherein the measurement device is connected to one receiving device at a time; triggering, automatically after the connection, a software update process to occur using the installed application; updating the software on the measurement device using the installed application; running the updated software on the measurement device; wherein the receiving device is not connected to the measurement device during the download step, the receiving device is not connected to the measurement device during the installing step and the receiving device is isolated from any wide area networks while connected to the measurement device.

Embodiments may include systems and methods, wherein the wireless connection is a Wi-Fi or a Bluetooth type connection.

Embodiments may include systems and methods, wherein the wide area network is a world wide web.

Embodiments may include systems and methods, wherein the downloading is performed from a store for application programs.

Embodiments may include systems and methods, wherein the receiving device is one of a mobile device, tablet, mini-tablet, smart phone, smart glasses or a wearable device.

Embodiments may include systems and methods, wherein the updated software is firmware.

Embodiments may include systems and methods, wherein the measurement device measures one or more of: altitude, speed, volume, temperature, pressure, vacuum, voltage, current, resistance, and distance.

Embodiments may include systems and methods, wherein the automatic triggering comprises requesting, by the receiving device, a line of code and transmitting by the measurement device a version line of code, and wherein software versions are compared.

Embodiments may include systems and methods, wherein a software version number is provided by the measurement device to the receiving device and wherein the version number from the measurement device is compared with a version number at the receiving device.

Embodiments may include systems and methods, wherein the software version number at the receiving device is received from the application program.

Embodiments may include systems and methods, wherein the receiving device further comprises a user interface.

Embodiments may include systems and methods, wherein the measurement device comprises a pneumatic system.

Embodiments may include systems and methods comprising measuring air pressure.

Embodiments may include systems and methods, wherein the measurement device comprises a controller printed circuit board and an interface printed circuit board.

An embodiment may include a system for updating software on a measurement device not connected to the internet, the system comprising: a computer programmed to push software updates through application programs sent to an application store; a receiving device comprising a display, a processor, a memory and a transceiver wherein the receiving device receives an application from an application store; and a measurement device comprising a CPU, a printed circuit board, a wireless communication module; a display and measuring equipment; wherein the measurement device communicates with the receiving device through a wireless communication and automatically receives software updates.

Embodiments may include systems and methods, wherein software resident on the printed circuit board is updated;

Embodiments may include systems and methods, wherein the measurement device is isolated from direct internet communications.

Embodiments may include systems and methods, wherein the receiving device is prevented from connecting to the measurement device and an internet connection simultaneously.

Embodiments may include systems and methods, wherein upon establishing communication between measurement device and receiving device a command triggers the verification of compatibility of software between the receiving device and the measuring device, if the software is not compatible an update is performed.

Embodiments may include systems and methods, wherein the receiving device is prevented from connecting to the internet while connected to the measuring device.

Embodiments may include systems and methods, wherein a server is used to push the application to the store.

Embodiments may include a system for updating software comprising: a mobile application program containing a software update stored on a memory device; a mobile computing device for downloading and executing the mobile application program; and a measurement device comprising measuring equipment, a wireless communication module and updateable software, wherein the measurement device communicates with the mobile computing device using the wireless communication module; wherein when executing the mobile application program on the mobile device automatically compares a line of code from the measurement device with a line of code from the application program to determine whether to update the updateable software.

Embodiments may include systems and methods, wherein the line of code from the measurement device is a version line of code and is communicated from the measurement device to the mobile computing device.

Embodiments may include systems and methods comprising restarting the measurement device after a software upgrade.

Embodiments may include systems and methods comprising a controller printed circuit board wherein the software being upgraded is software resident on the controller printed circuit board.

Embodiments may include systems and methods, wherein the measurement device further comprises a human interface module having firmware and the human interface module firmware is updated.

Embodiments may include systems and methods, wherein the measurement device further comprises a Pneumatic Controller Module having firmware and the pneumatic controller module firmware is updated.

Embodiments may include systems and methods, wherein the measurement device is rebooted after a software update has been processed.

Embodiments may include systems and methods, wherein a mobile device has an active touch screen or a virtual touch screen.

Embodiments may include systems and methods, wherein if it is determined that a software update is needed, a user interface screen will appear on the mobile device allowing the user to update software immediately or at a later time.

Embodiments may include systems and methods, wherein the receiving device cannot connect to the internet while connected to the measurement device Embodiments may include systems and methods, wherein the mobile application program prevents the mobile device from connecting to the internet while mobile device is communicating with measurement device.

Embodiments may include systems and methods, wherein the measurement device is isolated from the internet by disabling or blocking the mobile device from communicating with a wide area network while connected to the measurement device.

Embodiments may include systems and methods, wherein the mobile application program and a user interface on the mobile device allow a user to control the measurement device from the mobile device.

Embodiments may include systems and methods, wherein the measurement system reboots after a software update is completed.

Embodiments may include systems and methods, wherein the measurement device comprises a user interface including a display.

Embodiments may include systems and methods, wherein the measurement device comprises a controller printed circuit board and an interface printed circuit board.

Embodiments may include systems and methods, comprising a central location having one or more of a memory, a server, a display, an internet connection and a user interface.

Embodiments may include systems and methods, wherein the measurement device comprises sensors.

Embodiments may include systems and methods, wherein the measurement device comprises a pneumatic device including pneumatic ports, valves, sensors, pressure regulator, water separator, pressure pump and a vacuum.

Embodiments may include systems and methods, wherein the measurement device is used to perform measurements or testing using the user interface at the mobile device to control the measurement device.

Embodiments may include systems and methods, wherein only human interface module software is updated.

Embodiments may include systems and methods, wherein only pneumatic controller module firmware is updated.

Embodiments may include systems and methods, wherein the receiving device automatically connects to an internet website to download the upgraded or updated version of the software code for the measurement device.

Embodiments may include systems and methods, wherein the receiving device periodically connects to a dedicated website or an application store to check for updates to software for the measurement device, if an update is available, the receiving device will download the update and save the update in memory for later use. The periodic checking for updates may be automatic and done on a scheduled basis (e.g., weekly, monthly, quarterly, etc.)

Embodiments may include systems and methods, wherein upon mobile device connecting to the measurement device, a check or comparison is made of software versions and if necessary a software update is automatically processed.

Embodiments may include systems and methods, wherein the user is provided a chance to cancel the software updating process either before it begins and/or cancel during the update process.

Embodiments may include systems and methods, wherein the updated software is stored in memory on the mobile device and the software is checked by other software on the mobile device to ensure it is not corrupted.

Embodiments may include systems and methods, wherein the measurement device comprises a Wi-Fi server and does not have a Wi-Fi client or Wi-Fi client capabilities, wherein the measurement device is not able to directly connect to the internet or other wide area network.

Embodiments may include systems and methods, wherein the receiving device is restricted or blocked from accessing the internet or other wide area network while connected to the measurement device.

Embodiments may include systems and methods, wherein Wi-Fi Direct protocol is used for the communication between the receiving device or mobile device and the measurement device.

There are a number of novel and non-obvious aspects of the present invention. This disclosure is not intended to be limiting and variations beyond what is disclosed are intended. The terms and descriptions used herein are set forth by way of illustration only and are not meant as limitations. Features discussed with respect to one embodiment may be combined with one or more other embodiments. Those skilled in the art will recognize that many variations are possible within the spirit and scope of the invention as defined in the following claims, and their equivalents, in which all terms are to be understood in their broadest possible sense unless otherwise indicated.

What is claimed:

1. A method for automatically and remotely updating software on an instrument measurement device isolated from wide area networks, comprising the steps of:
   downloading an application onto a receiving device from a wide area network;
   wherein the application configures the receiving device to prevent devices other than the instrument measurement device from communicating with the receiving device whenever the instrument measurement device communicates with the receiving device through a peer-to-peer wireless Wi-Fi Direct protocol connection that transfers data directly between the receiving device and the instrument measurement device;
   installing the downloaded application on the receiving device;
   establishing the peer-to-peer wireless Wi-Fi Direct protocol connection between the receiving device and the instrument measurement device, wherein the instrument measurement device is connected to not more than one receiving device at a time;
   triggering, automatically after the establishing the connection, a software update process of the installed application;
   updating the software on the instrument measurement device by the software update process; and running the updated software on the instrument measurement device, wherein the receiving device is not connected to the instrument measurement device during the downloading step, the receiving device is not connected to the instrument measurement device during the installing step, and the receiving device is isolated from any wide area networks while connected to the instrument measurement device, wherein the application configures the receiving device to automatically trigger a verification of isolation of the instrument measurement device from an instrument to be measured by the instrument measurement device, and the application configures the receiving device not to perform the update of the software on the instrument measurement device whenever the verification of isolation fails to determine that the instrument measurement device is isolated from the instrument to be measured.

2. The method of claim 1, wherein the downloading is from a store offering one or more application programs.

3. The method of claim 1, wherein the receiving device is one of:
   a mobile device, a tablet, a mini-tablet, and a smart phone.

4. The method of claim 1, wherein the updated software is fit mware.

5. The method of claim 1, further comprising measuring by the instrument measurement device one or more of: altitude, speed, volume, temperature, pressure, vacuum, voltage, current, resistance, and distance.

6. The method of claim 1, wherein the automatic triggering of the update process includes requesting, by the receiving device, a line of code and transmitting by the measurement device a version line of code, and wherein software versions are compared.

7. The method of claim 1, further comprising:
providing, by the instrument measurement device to the receiving device, a software version number of the measurement device; and
comparing the software version number of the measurement device with a version number of the receiving device.

8. The method of claim 7, further comprising:
providing, by the downloaded application of the receiving device, the software version number of the receiving device, wherein
the receiving device is a digital, touch-screen device, and
the running the updated software on the instrument measurement device includes
wirelessly connecting the receiving device to the instrument measurement, device, and
operating the measurement device remotely via the wireless connection to measure a parameter of an instrument.

9. The method of claim 4, further comprising:
prior to the updating the software on the instrument measurement device by the software update process, isolating the instrument measurement device from an instrument to be measured, wherein the running the updated software on the instrument measurement device includes:
producing a calibration signal by the instrument measurement device,
specifying a target value of the calibration signal, and
delivering the calibration signal to an input of the instrument to be measured.

10. The method of claim 4, wherein the software update process includes
determining to update a firmware of a first printed circuit board;
determining to update a firmware of a second printed circuit board; and
completing an updating of the firmware of the first printed circuit board before commencing an updating of the firmware of the second printed circuit board.

11. The method of claim 10, wherein the instrument measurement device comprises a Wi-Fi server, lacks Wi-Fi client capabilities and is configured to directly connect to the mobile device using the Wi-Fi Direct protocol connection and is not able to directly connect to the Internet or other wide area network, wherein, after the software update process, the running the updated software on the instrument measurement device includes:
controlling a human interface device by the first printed circuit board; and
controlling a pneumatic pump by the second printed circuit board.

12. The method of claim 1, wherein the running the updated software on the instrument measurement device includes:
generating an air pressure by the instrument measurement device and
providing the generated air pressure from the instrument measurement device to an input of a pneumatic instrument, and wherein
the instrument measurement device is, not connected to the pneumatic instrument during the installing step.

13. A system for updating software on an instrument measurement device, the system comprising:
a computer programmed to push a software update through an application program sent to an application store;

a receiving device including a display, a processor, a memory, and a transceiver, wherein the receiving device receives the application program from the application store; and
an instrument measurement device including a central processing unit (CPU), a printed circuit board, a wireless communication module, a display, and a measuring equipment, wherein the receiving device is not connected to the instrument measurement device during the receiving of the application program, and the receiving device is isolated from any wide area networks while connected to the instrument measurement device, wherein
the application program configures the processor to prevent devices other than the instrument measurement device from communicating with the receiving device whenever the instrument measurement device communicates with the receiving device through a peer-to-peer wireless Wi-Fi Direct protocol communication link that transfers data directly between the receiving device and the instrument measurement device,
after establishing the peer-to-peer wireless Wi-Fi Direct protocol connection between the receiving device and the instrument measurement device, the application program configures the processor to automatically trigger a verification of compatibility between the application program and the software on the instrument measurement device,
the application program configures the processor to perform an update of the software on the instrument measurement device whenever the verification of compatibility determines that the software on the instrument measurement device is incompatible with the application program,
the application program configures the processor to automatically trigger a verification of isolation of the instrument measurement device from an instrument to be measured by the instrument measurement device, and
the application program configures the processor not to perform the update of the software on the instrument measurement device whenever the verification of isolation fails to determine that the instrument measurement device is isolated from the instrument to be measured.

14. A system for updating software, the system comprising:
a first memory device storing a mobile application program containing a software update;
a mobile computing device configured to download and execute the application program; and
a measurement device including a measuring equipment, a wireless communication module, and a second memory device to store updateable software;
the measurement device being configured to communicate with the mobile computing device using the wireless communication module;
the mobile computing device being configured, when executing the mobile application program, to automatically compare a line of code from the measurement device with a line of code from the mobile application program to determine whether to update the updateable software of the measurement device; and
the mobile computing device being configured, when executing the mobile application program, to communicate with the measurement device using a peer-to-peer wireless Wi-Fi Direct protocol connection that transfers data directly between the mobile device and the measurement device and to isolate the mobile device from communication with external compute devices other than the measurement device, wherein after establishing the peer-to-peer wireless Wi-Fi Direct protocol connection between the mobile computing device and the measurement device, the updateable software is updated automatically, the mobile computing device is not connected to the measurement device during the downloading, the mobile computing device is isolated from any wide area networks while connected to the measurement device, the application program configures the mobile computing device to automatically trigger a verification of isolation of the measurement equipment from an instrument to be measured by the measurement equipment, and the application program configures the mobile computing device not to perform the update of the software on the measurement device whenever the verification of isolation fails to determine that the measurement equipment is isolated from the instrument to be measured.

15. The system of claim 14, wherein the measuring equipment further includes a pneumatic port, a valve, a sensor, a pressure regulator, a water separator, a pressure pump, and a vacuum pump.

16. The system of claim 14, wherein the measurement device comprises a Wi-Fi server and lacks Wi-Fi client capabilities, and wherein the measurement device is configured to connect to the mobile device using the Wi-Fi Direct protocol connection and is not able to directly connect to the Internet or other wide area network.

* * * * *